United States Patent
Luo et al.

(10) Patent No.: US 11,323,790 B2
(45) Date of Patent: May 3, 2022

(54) DYNAMIC BANDWIDTH ALLOCATION METHOD AND RELATED DEVICE

(71) Applicant: Huawei Technologies Co., Ltd., Shenzhen (CN)

(72) Inventors: Jun Luo, Dongguan (CN); Enqi Xu, Shenzhen (CN); Xun Lu, Xi'an (CN); Zhanfeng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/316,476

(22) Filed: May 10, 2021

(65) Prior Publication Data

US 2021/0266651 A1 Aug. 26, 2021

Related U.S. Application Data

(63) Continuation of application No. PCT/CN2019/117267, filed on Nov. 11, 2019.

(30) Foreign Application Priority Data

Nov. 12, 2018 (CN) .......................... 201811342671.0

(51) Int. Cl.
*H04Q 11/00* (2006.01)
*H04L 47/78* (2022.01)

(52) U.S. Cl.
CPC ....... *H04Q 11/0067* (2013.01); *H04L 47/788* (2013.01); *H04Q 2011/0064* (2013.01); *H04Q 2011/0086* (2013.01)

(58) Field of Classification Search
CPC .................................................. H04Q 11/0067
See application file for complete search history.

(56) References Cited

U.S. PATENT DOCUMENTS

| 8,824,504 | B2 | 9/2014 | Zou |
| 2004/0252714 | A1 | 12/2004 | Oh et al. |
| 2007/0133596 | A1* | 6/2007 | Kim ...................... H04J 3/1694 370/465 |
| 2012/0051371 | A1 | 3/2012 | Sarashina et al. |

(Continued)

FOREIGN PATENT DOCUMENTS

| CN | 1855778 A | 11/2006 |
| CN | 101159699 A | 4/2008 |

(Continued)

*Primary Examiner* — Shi K Li
(74) *Attorney, Agent, or Firm* — Slater Matsil, LLP

(57) ABSTRACT

This application provides a dynamic bandwidth allocation method and a related device. The method includes: receiving, by a dynamic bandwidth allocation device, bandwidth request messages from bandwidth request devices through at least two access ports of a convergence device, wherein the bandwidth request messages include requested bandwidth information; allocating bandwidth information to the bandwidth request device based on the requested bandwidth information and remaining bandwidth information of an upstream egress port of the convergence device, wherein the remaining bandwidth information is a difference between limited bandwidth information of the upstream egress port and bandwidth information already allocated; and sending a response message to the bandwidth request device through the access port.

19 Claims, 16 Drawing Sheets

(56) References Cited

U.S. PATENT DOCUMENTS

2013/0039182 A1* 2/2013 Das .................. H04L 47/14
                                                     370/235
2015/0263916 A1   9/2015 Phillips
2019/0356406 A1* 11/2019 Doo ................. H04J 14/0245

FOREIGN PATENT DOCUMENTS

| CN | 101378388 A | 3/2009 |
|----|-------------|--------|
| CN | 102045605 A | 5/2011 |
| CN | 101674580 B | 2/2012 |
| CN | 102647339 A | 8/2012 |
| CN | 102907044 A | 1/2013 |
| CN | 103260196 A | 8/2013 |
| CN | 104468409 A | 3/2015 |
| CN | 105592559 A | 5/2016 |
| CN | 105933064 A | 9/2016 |
| EP | 2073565 A2  | 6/2009 |
| WO | 2010020130 A1 | 2/2010 |
| WO | 2012106984 A1 | 8/2012 |

* cited by examiner

DYNAMIC BANDWIDTH ALLOCATION METHOD AND RELATED DEVICE

CROSS-REFERENCE TO RELATED APPLICATIONS

This application is a continuation of International Application No. PCT/CN2019/117267, filed on Nov. 11, 2019, which claims priority to Chinese Patent Application No. 201811342671.0, filed on Nov. 12, 2018. The disclosures of the aforementioned applications are hereby incorporated by reference in their entireties.

TECHNICAL FIELD

This application relates to the field of communications technologies, and in particular, to a dynamic bandwidth allocation method and a related device.

BACKGROUND

With rapid development and innovation of internet technologies, users raise increasing requirements for diversity of internet information. This requires that an access network meet users' requirements for high-bandwidth access and multi-service quality. A passive optical network (PON) is rapidly developed as a high-speed bandwidth access technology, and a PON system usually includes an optical line terminal (OLT), an optical network unit (ONU), and an optical distribution network (ODU).

A community antenna television cable network is a network formed based on a community antenna television network, and cable access is a network access technology based on a community antenna television (CATV) network. The community antenna television network has been developed with expansion of network applications in recent years, and mainly uses the community antenna television network for data transmission. In the world, a cable mainly uses a data over cable service interface specifications (DOCSIS) standard protocol. The DOCSIS standard mainly supports IP data packet transmission between a computer network and a cable television network, and between a cable television front end (or an optical node of a hybrid fiber-coaxial cable network (HFC)) and a user. A cable modem termination system (CMTS) is a head-end (central-office-end) device; and may be deployed at a front end of the community antenna television network, or may be deployed on an optical node in a bidirectional HFC network. The cable modem termination system functions as a gateway between a data network and the HFC network, and a cable modem (CM) is a terminal device between the HFC network and customer premise equipment (CPE).

A common characteristic of point-to-multipoint (P2MP) networks such as a PON network and a cable network is: Both are point-to-multipoint networks sharing a medium. In an upstream direction, to avoid a conflict and improve efficiency, an access system usually uses a time division multiple access (TDMA) protocol for time division multiplexing or an orthogonal frequency division multiple access (OFDMA) protocol to complete upstream traffic transmission on a shared transmission channel.

However, in the prior art, traffic scheduling and bandwidth allocation are performed locally. For example, in PON access, there is one dynamic bandwidth allocation (DBA) controller for each PON port of an OLT, bandwidth information obtainable by each ONU is calculated and allocated in real time (usually in microseconds or milliseconds) based on a bandwidth request of a connected ONU, and a timeslot (time slice) is allocated to the ONU on a shared physical channel based on the obtainable bandwidth information. Each ONU sends upstream data in one timeslot allocated to the ONU, to ensure that no conflict occurs between a plurality of ONUs sharing the physical channel.

In the prior art, no solution is provided to cope with upstream congestion and an upstream packet loss in a P2MP convergence network. How to implement global bandwidth information allocation and ensure that upstream congestion and a packet loss do not occur in the P2MP convergence network is a current urgent problem that needs to be resolved.

SUMMARY

This application provides a dynamic bandwidth allocation method and a related device. Global scheduling and global dynamic bandwidth information allocation are performed for bandwidth request messages sent by all bandwidth request devices, and token authorization is performed for each bandwidth request device, to ensure that bandwidth occupied by total upstream traffic entering an access network is less than a limited bandwidth of an upstream egress port of a convergence device. This can avoid congestion and an internal packet loss that occurs in upstream, and effectively reduce a delay, costs, and power consumption of an entire network.

According to a first aspect, a dynamic bandwidth allocation method is provided, including: A dynamic bandwidth allocation controller receives bandwidth request messages from bandwidth request devices through at least two access ports of a convergence device. The bandwidth request messages include a first bandwidth request message from a first bandwidth request device received through a first access port of the convergence device, and the first bandwidth request message includes bandwidth information requested by the first bandwidth request device. The dynamic bandwidth allocation controller allocates bandwidth information to the first bandwidth request device based on the bandwidth information requested by the first bandwidth request device and remaining bandwidth information of an upstream egress port of the convergence device. The remaining bandwidth information is a difference between limited bandwidth information of the upstream egress port and bandwidth information already allocated before the first bandwidth request message is received. The dynamic bandwidth allocation controller a response message to the first bandwidth request device through the first access port. The response message includes the bandwidth information allocated to the first bandwidth request device.

In the solution provided in this application, the dynamic bandwidth allocation controller receives, through a plurality of access ports of the convergence device, the bandwidth request messages sent by all the bandwidth request devices, and allocates bandwidth information to the bandwidth request devices based on the remaining bandwidth information of the upstream egress port of the convergence device. In this way, a sum of bandwidth information requested by using all the upstream bandwidth request messages can be collected accurately, scheduling and global allocation can be performed for all the bandwidth request messages, and it is ensured that bandwidth information occupied by total upstream traffic does not exceed the limited bandwidth information of the upstream egress port of the convergence device. Therefore, upstream congestion and an internal packet loss are avoided, and costs and power consumption of the convergence device are effectively reduced.

It may be understood that the dynamic bandwidth allocation controller includes but is not limited to a global dynamic allocation controller, a global DBA controller, a DBA controller, or a dynamic bandwidth allocation device.

With reference to the first aspect, in a possible implementation of the first aspect, the global DBA controller allocates bandwidth information of a logical access port to the first bandwidth request device, to obtain a startup time of a time slice obtained by the first bandwidth request device through allocation on the logical access port. The bandwidth information of the logical access port is equal to the remaining bandwidth information of the upstream egress port. The global DBA controller allocates bandwidth information of the first access port to the first bandwidth request device based on the startup time, to obtain a start time of a time slice obtained by the first bandwidth request device through allocation on the first access port. A difference between the start time and the startup time is less than a first threshold.

In the solution provided in this application, the global DBA controller virtualizes all access ports of the convergence device into one logical port, and evenly allocates bandwidth information on the logical port based on all received bandwidth request messages, so that an actual startup time of a time slice allocated on each physical access port is controlled to be close to a startup time of a time slice allocated on the logical access port, to avoid a burst, to be specific, a large amount of upstream traffic is flooded from each physical access port at the same time. In this way, a bandwidth is evenly allocated without a burst.

With reference to the first aspect, in a possible implementation of the first aspect, the global DBA controller determines the bandwidth information requested by using the first bandwidth request message. If the bandwidth information requested by using the first bandwidth request message is greater than a second threshold, the global DBA controller generates a plurality of bandwidth request sub-messages based on the bandwidth information requested by using the first bandwidth request message. A sum of bandwidth information requested by using the plurality of bandwidth request sub-messages is equal to the bandwidth information requested by using the first bandwidth request message. If the bandwidth information requested by using the first bandwidth request message is less than a third threshold, the global DBA controller blocks the first bandwidth request message, continues to receive a second bandwidth request message sent by the first bandwidth request device, and reassembles the first bandwidth request message and the second bandwidth request message to obtain a reassembled bandwidth request message. Bandwidth information requested by using the reassembled bandwidth request message is equal to a sum of the bandwidth information requested by using the first bandwidth request message and bandwidth information requested by using the second bandwidth request message. When the bandwidth information requested by using the reassembled bandwidth request message is greater than a fourth threshold, the global DBA controller allocates bandwidth information to the first bandwidth request device based on the bandwidth information requested by using the reassembled bandwidth request message and the remaining bandwidth information of the upstream egress port of the convergence device; or when a waiting time is greater than a fifth threshold, the global DBA controller unblocks the first bandwidth request message.

In the solution provided in this application, after determining bandwidth information requested by using a bandwidth request message, the global DBA controller may further process a bandwidth request message. If the bandwidth information requested by using the bandwidth request message is excessively large, a plurality of bandwidth request sub-messages may be generated to replace the bandwidth request message, as long as it is ensured that a sum of bandwidth information requested by using the plurality of bandwidth request sub-messages is equal to the bandwidth information requested by using the original bandwidth request message. In this way, a comparatively large burst generated by the entire system because an excessively long time slice is allocated to a single bandwidth request message can be avoided, and impact on a timely response to a bandwidth request message sent by another user with a higher priority can be avoided. In addition, if the bandwidth information requested by using the bandwidth request message is excessively small, the request message may be temporarily blocked, a bandwidth request message sent by the bandwidth request device continues to be received, and the received bandwidth request message is reassembled. When bandwidth information requested by using the reassembled bandwidth request message accumulates to a value that exceeds a preset threshold, bandwidth information is allocated to the reassembled bandwidth request message; or when a waiting time exceeds a preset threshold, the request message is unblocked, and bandwidth information is allocated to the request message. In this way, a waste of bandwidth information caused by allocating an excessively small time slice to a single bandwidth request message can be avoided, and it can be avoided that a bandwidth request message whose requested bandwidth information is excessively small is not responded to for a long time.

With reference to the first aspect, in a possible implementation of the first aspect, bandwidth information allocated by the global DBA controller to the first bandwidth request device through a first-level port is less than or equal to configured bandwidth information of an upstream egress of the first-level port; and bandwidth information allocated by the global DBA controller to the first bandwidth request device through a second-level port is less than or equal to configured bandwidth information of an upstream egress of the second-level port. The first-level port is higher than the second-level port, and the bandwidth information allocated to the first bandwidth request device through the first-level port is less than or equal to the remaining bandwidth information of the upstream egress port of the convergence device.

In the solution provided in this application, the global DBA controller allocates bandwidth information to the bandwidth request device hierarchically and performs bandwidth control, to ensure that the bandwidth information allocated to the bandwidth request device does not exceed the limited bandwidth information of the upstream egress port of the convergence device, and bandwidth information allocated to a port at each layer inside the convergence device does not exceed configured bandwidth information of an upstream egress of the port at the level. In this way, it is ensured that congestion in upstream and an internal packet loss do not occur. In addition, a priority-based scheduling policy can be met, ensuring that higher-priority users obtain better services and bandwidth information.

With reference to the first aspect, in a possible implementation of the first aspect, the global DBA controller sends the response message to the convergence device through cascading ports.

In the solution provided in this application, the global DBA controller may send, to the convergence device through the cascading ports, the bandwidth information allocated to the bandwidth request device, to separate the global DBA controller from the convergence device and the bandwidth request device and flexibly deploy the convergence device and the bandwidth request device.

With reference to the first aspect, in a possible implementation of the first aspect, the bandwidth information includes byte length information and/or time slice information that are/is allowed to be sent, and the time slice information includes start time information and time length information.

With reference to the first aspect, in a possible implementation of the first aspect, the global DBA controller keeps time synchronization with the bandwidth request device according to a time synchronization protocol.

In the solution provided in this application, the global DBA controller keeps time synchronization with the bandwidth request device based on the time synchronization protocol. In this way, it can be ensured that a timestamp of the global DBA controller is consistent with that of the bandwidth request device, and the global DBA controller can allocate all bandwidth information globally.

With reference to the first aspect, in a possible implementation of the first aspect, when the convergence device is a level-2 convergence device, the first bandwidth request device is a first access device, and the first bandwidth request message is a bandwidth request message sent by the first access device.

Correspondingly, the receiving, by a global DBA controller, bandwidth request messages from bandwidth request devices through at least two access ports of a convergence device, where the bandwidth request messages include a first bandwidth request message from a first bandwidth request device received through a first access port of the convergence device, and the first bandwidth request message includes bandwidth information requested by the first bandwidth request device, includes: The global DBA controller receives bandwidth request messages from access devices through at least two access ports of the level-2 convergence device. The bandwidth request messages include a first bandwidth request message from the first access device received through a first access port of the level-2 convergence device, and the first bandwidth request message includes bandwidth information requested by the first access device.

Correspondingly, the allocating, by the global DBA controller, bandwidth information to the first bandwidth request device based on the bandwidth information requested by the first bandwidth request device and remaining bandwidth information of an upstream egress port of the convergence device, where the remaining bandwidth information is a difference between limited bandwidth information of the upstream egress port and bandwidth information already allocated before the first bandwidth request message is received, includes: The global DBA controller allocates bandwidth information to the first access device based on the bandwidth information requested by the first access device and remaining bandwidth information of an upstream egress port of the level-2 convergence device, and the remaining bandwidth information is a difference between limited bandwidth information of the upstream egress port of the level-2 convergence device and the bandwidth information already allocated before the first bandwidth request message is received.

Correspondingly, the sending, by the global DBA controller, a response message to the first bandwidth request device through the first access port, where the response message includes the bandwidth information allocated to the first bandwidth request device, includes: The global DBA controller sends a response message to the first access device through the first access port of the level-2 convergence device. The response message includes the bandwidth information allocated to the first access device.

With reference to the first aspect, in a possible implementation of the first aspect, when the convergence device is a level-1 convergence device, the first bandwidth request device is a first level-2 convergence device, the first bandwidth request message is a bandwidth request message sent by the first level-2 convergence device, and the bandwidth information requested by using the first bandwidth request message is a sum of bandwidth information requested by using a bandwidth request message sent by at least one access device.

Correspondingly, the receiving, by a global DBA controller, bandwidth request messages from bandwidth request devices through at least two access ports of a convergence device, where the bandwidth request messages include a first bandwidth request message from a first bandwidth request device received through a first access port of the convergence device, and the first bandwidth request message includes bandwidth information requested by the first bandwidth request device, includes: The global DBA controller receives bandwidth request messages from first level-2 convergence devices through at least two access ports of the level-1 convergence device. The bandwidth request messages include the first bandwidth request message from the first level-2 convergence device received through a first access port of the level-1 convergence device, and the first bandwidth request message includes bandwidth information requested by the first level-2 convergence device.

Correspondingly, the allocating, by the global DBA controller, bandwidth information to the first bandwidth request device based on the bandwidth information requested by the first bandwidth request device and remaining bandwidth information of an upstream egress port of the convergence device, where the remaining bandwidth information is a difference between limited bandwidth information of the upstream egress port and bandwidth information already allocated before the first bandwidth request message is received, includes: The global DBA controller allocates bandwidth information to the first level-2 convergence device based on the bandwidth information requested by the first level-2 convergence device and remaining bandwidth information of an upstream egress port of the level-1 convergence device. The remaining bandwidth information is a difference between limited bandwidth information of the upstream egress port of the level-1 convergence device and the bandwidth information already allocated before the first bandwidth request message is received.

Correspondingly, the sending, by the global DBA controller, a response message to the first bandwidth request device through the first access port, where the response message includes the bandwidth information allocated to the first bandwidth request device, includes: The global DBA controller sends a response message to the first level-2 convergence device through the first access port of the level-1 convergence device. The response message includes the bandwidth information allocated to an upstream egress port of the first level-2 convergence device.

In the solution provided in this application, global DBA controllers may be deployed on the level-2 convergence device, may be deployed on the level-1 convergence device, or may be deployed on both the level-1 convergence device and the level-2 convergence device, so that positions of the global DBA controllers can be deployed flexibly. In addition, through multi-level deployment, the global DBA controllers can serve a larger scope, and the entire system is more stable and efficient.

According to a second aspect, a dynamic bandwidth allocation device is provided and applied to a network side. The dynamic bandwidth allocation device may be an optical line terminal, a switch, a router, or a control and management device; or may be a chip in an optical line terminal, a switch, a router, or a control and management device. The dynamic bandwidth allocation device has functions of implementing the dynamic bandwidth allocation device in the first aspect. The functions may be implemented by hardware, or may be implemented by hardware executing corresponding software. The hardware or the software includes one or more units corresponding to the functions.

In a possible design, the dynamic bandwidth allocation device includes a processing module and a transceiver module. The processing module may be, for example, a processor. The transceiver module may be, for example, a transceiver. The transceiver may include a radio frequency circuit and a baseband circuit. The transceiver module is configured to support communication between the dynamic bandwidth allocation device and a user terminal (a bandwidth request device) and between the dynamic bandwidth allocation device and a core network device. In an example, the transceiver module may further include a sending module and a receiving module, and may be configured to support the dynamic bandwidth allocation device in performing upstream communication and upstream communication. For example, the sending module may be configured to send a corresponding message to a bandwidth request device. The receiving module may be configured to receive bandwidth request messages from the bandwidth request device. The bandwidth request messages include a first bandwidth request message from a first bandwidth request device received through a first access port of the convergence device. The first bandwidth request message includes bandwidth information requested by the first bandwidth request device. The processing module may be configured to allocate bandwidth information to the first bandwidth request device based on the bandwidth information requested by the first bandwidth request device and remaining bandwidth information of an upstream egress port of the convergence device. The remaining bandwidth information is a difference between limited bandwidth information of the upstream egress port and bandwidth information already allocated before the first bandwidth request message is received. Optionally, the dynamic bandwidth allocation device may further include a memory. The memory is configured to be coupled to the processor, and the memory stores a program instruction and data that are necessary for the dynamic bandwidth allocation device.

In another possible design, the dynamic bandwidth allocation device includes a processor, a baseband circuit, a radio frequency circuit, and an antenna. The processor is configured to control functions of each circuit component. The baseband circuit, the radio frequency circuit, and the antenna are configured to support communication between the dynamic bandwidth allocation device and a user terminal (a bandwidth request device) and between the dynamic bandwidth allocation device and a core network device. For example, in upstream communication, the radio frequency circuit of the dynamic bandwidth allocation device may perform processing such as digital conversion, filtering, amplification, and down-conversion on the bandwidth request message that sent by the bandwidth request device and received by using the antenna, decode a processed bandwidth request message by using the baseband circuit, and decapsulate a decoded processed bandwidth request message based on a protocol, to obtain the bandwidth information requested by using the bandwidth request message. Optionally, the dynamic bandwidth allocation device further includes a memory. The memory stores a program instruction and data that are necessary for the dynamic bandwidth allocation device. For example, in downstream communication, the baseband circuit of the dynamic bandwidth allocation device generates a response message carrying allocated bandwidth information. After the radio frequency circuit performs processing such as analog conversion, filtering, amplification, and up-conversion on the response message, a processed response message is sent by the antenna to the bandwidth request device.

In still another possible design, the dynamic bandwidth allocation device includes a processor and a modem. The processor may be configured to run an instruction or an operating system, to control functions of the dynamic bandwidth allocation device. The modem may perform processing such as encapsulation, encoding/decoding, modulation/demodulation, and equalization on data based on a protocol, to generate a response message carrying allocated bandwidth information, and support the dynamic bandwidth allocation device in performing corresponding functions in the first aspect. The modem may be further configured to receive the bandwidth request message sent by the bandwidth request device, to decode the bandwidth request message to obtain the requested bandwidth information.

In still another possible design, when the dynamic bandwidth allocation device is a chip in an optical line terminal, a switch, a router, or a control and management device, the chip includes a processing module and a transceiver module. The processing module may be, for example, a processor. The processor may be configured to perform processing such as filtering, demodulation, power amplification, and decoding on a data packet that is received by the transceiver module and that carries the bandwidth request message. The transceiver module may be, for example, an input/output interface, a pin, or a circuit on the chip. The processing module may execute a computer executable instruction stored in a storage unit, to support the dynamic bandwidth allocation device in performing corresponding functions in the first aspect. Optionally, the storage unit may be a storage unit in the chip, for example, a register or a buffer. The storage unit may alternatively be a storage unit, located outside the chip, in the dynamic bandwidth allocation device, for example, a read-only memory (read-only memory, ROM for short) or another type of static storage device that can store static information and instructions, or a random access memory (random access memory, RAM for short).

In still another possible implementation, the dynamic bandwidth allocation device includes a processor. The processor is configured to: be coupled to a memory, read instructions in the memory, and perform, according to the instructions, the functions of the dynamic bandwidth allocation device in the first aspect. The memory may be located inside the processor, or may be located outside the processor.

According to a third aspect, a computer non-transient storage medium is provided, including an instruction. When the instruction is run on a dynamic bandwidth allocation device, the dynamic bandwidth allocation device is enabled to perform the method according to any one of the first aspect or the possible implementations of the first aspect.

According to a fourth aspect, a computer program product including an instruction is provided. When the computer program product is run on a computer, the computer is enabled to perform the method in the first aspect or the method in any possible implementation of the first aspect. All or a part of the computer program product may be stored in a storage medium encapsulated in a processor, or all or a part of the computer program product may be stored in a storage medium encapsulated outside a processor.

DETAILED DESCRIPTION OF ILLUSTRATIVE EMBODIMENTS

The following describes technical solutions of this application with reference to accompanying drawings.

Figure 1:
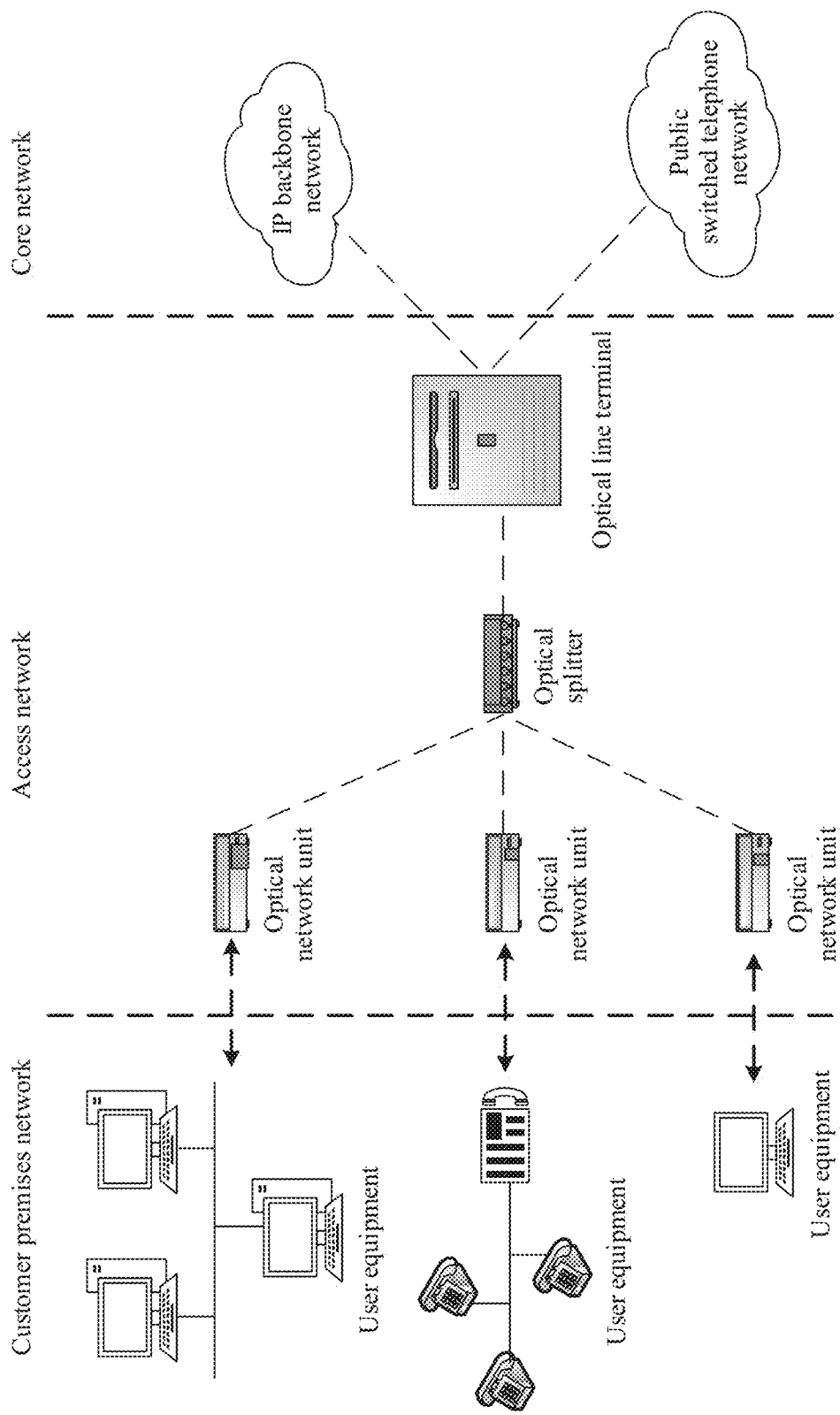
FIG. 1 is a schematic diagram of a scenario of a passive optical network according to an embodiment of this application.

For ease of understanding and description, a passive optical network (PON) is used as a specific application scenario for description. As shown in FIG. 1, a plurality of optical network units (ONU) are connected to a plurality of user equipments in a customer premises network, and the plurality of ONUs send bandwidth request messages to an optical line terminal (OLT) by using an optical fiber and an optical splitter in an optical distribution network (ODN). The OLT receives the bandwidth request messages sent by the plurality of ONUs, and allocates bandwidth information to each ONU. Each ONU sends an upstream packet on allocated bandwidth information. The OLT receives the upstream packets sent by the ONUs and sends the upstream packets to a core network (for example, an internet protocol (IP), a backbone network, and a public switched telephone network (PSTN)).

Figure 2:
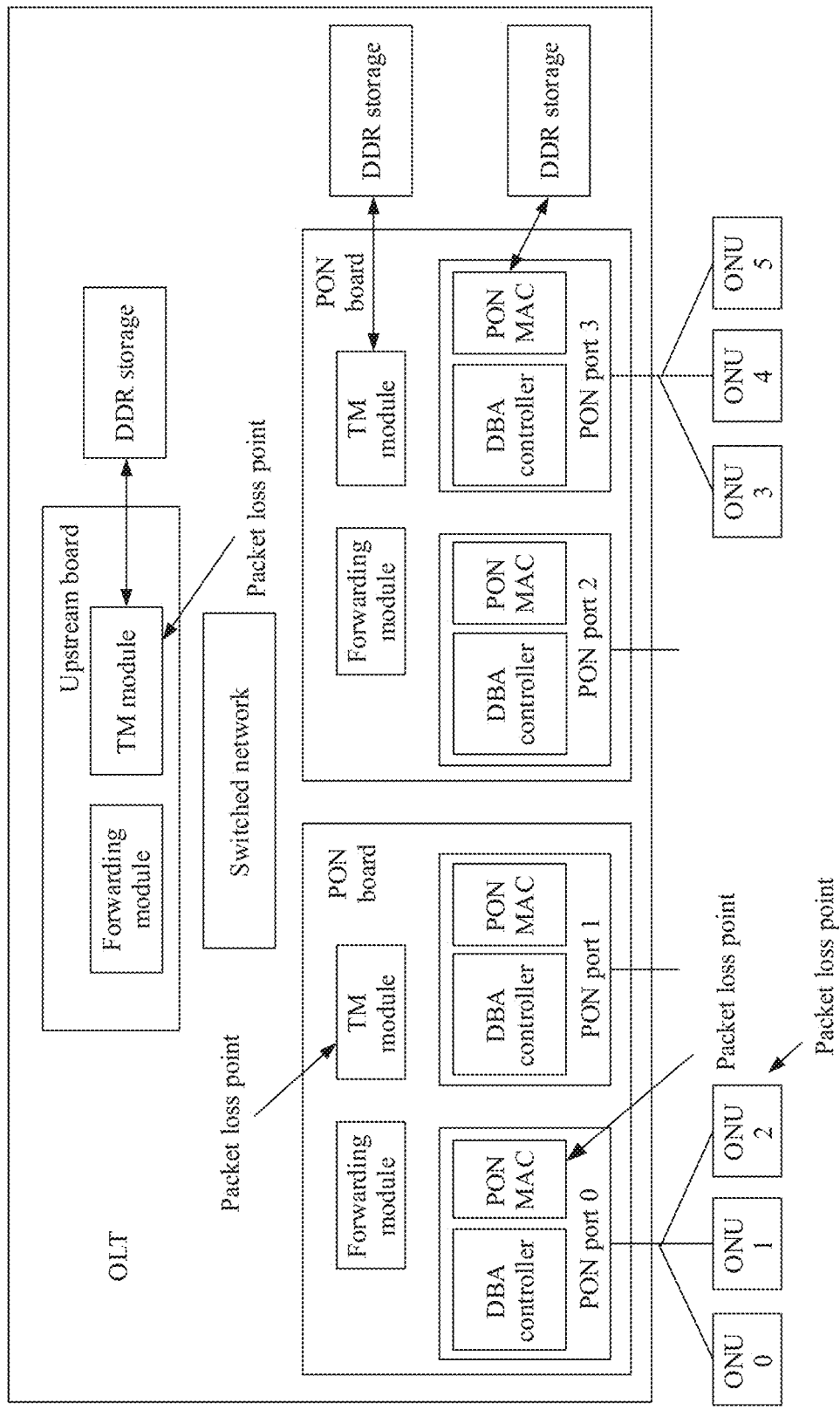
FIG. 2 is a schematic structural diagram of an existing optical line terminal according to an embodiment of this application.

As shown in FIG. 2, an existing OLT device is usually provided with a plurality of line card PON boards. Upstream packets of the plurality of PON boards are converged to one upstream board through a switched network. Each PON board includes a forwarding module and a traffic management (TM) module, and supports the plurality of PON ports. Currently, each PON port is provided with one independent dynamic bandwidth allocation (DBA) controller and a media access control (PON MAC) chip. Each DBA controller can perform management and bandwidth information allocation only on ONUs connected to a corresponding physical PON port. Each PON MAC chip requires an off-chip double data rate synchronous dynamic random access memory (DDR) buffer. It should be noted that, when one PON board supports a plurality of PON ports, because each PON port is independently scheduled and an upstream egress of the PON board is usually converged (that is, fixed), a comparatively large burst may be generated (to be specific, allocated bandwidth information is greater than bandwidth information of the upstream egress), resulting in congestion and a packet loss. For example, if a bandwidth of an upstream egress of a PON board is 40 G and the PON board supports 16 PON ports each with 10 G, a maximum burst bandwidth of an upstream ingress may reach 160 G. In this case, an upstream TM chip needs to be designed for each PON board, a large-capacity DDR external buffer is required, and the PON MAC chip needs to reassemble fragmented packets from ONUs. If an off-chip DDR buffer needs to be used, a DDR buffer bandwidth of 160 G needs to be separately designed for the PON MAC chip. This increases costs, complexity, and power consumption of the PON board and the PON MAC chip. However, in practice, average traffic of upstream users may be comparatively small, and a bandwidth occupied by the average traffic neither reaches 160 G nor exceeds 40 G. This greatly wastes performance, power consumption, and costs. In addition, when upstream traffic of a plurality of PON boards is converged to one upstream board, a problem that an input bandwidth is greater than an output bandwidth also occurs. Consequently, congestion and a packet loss may be caused. In addition, a TM chip in the upstream board uses a DDR buffer to perform off-chip storage and hierarchical quality of service (HQoS) scheduling on the converged upstream traffic; in this case, there is still a comparatively large waste of performance, power consumption, and costs. It can be learned that the entire system has packet loss points from the ONUs to the PON MAC chip reassembly, to the TM module of the PON board, and to the TM module of the upstream board; and performance, power consumption, and costs are greatly wasted.

To resolve the foregoing problems, this application provides a dynamic bandwidth allocation method and a related device, to perform global traffic scheduling and bandwidth information allocation. This avoids congestion and a packet loss in upstream, and reduces network costs and power consumption.

The technical solutions in the embodiments of this application may be applied to a passive optical network (PON), or may be applied to a community antenna television cable (Cable) network, a wireless local area network (WLAN), or all other point-to-multipoint (P2MP) networks that share an access medium.

Figure 3:
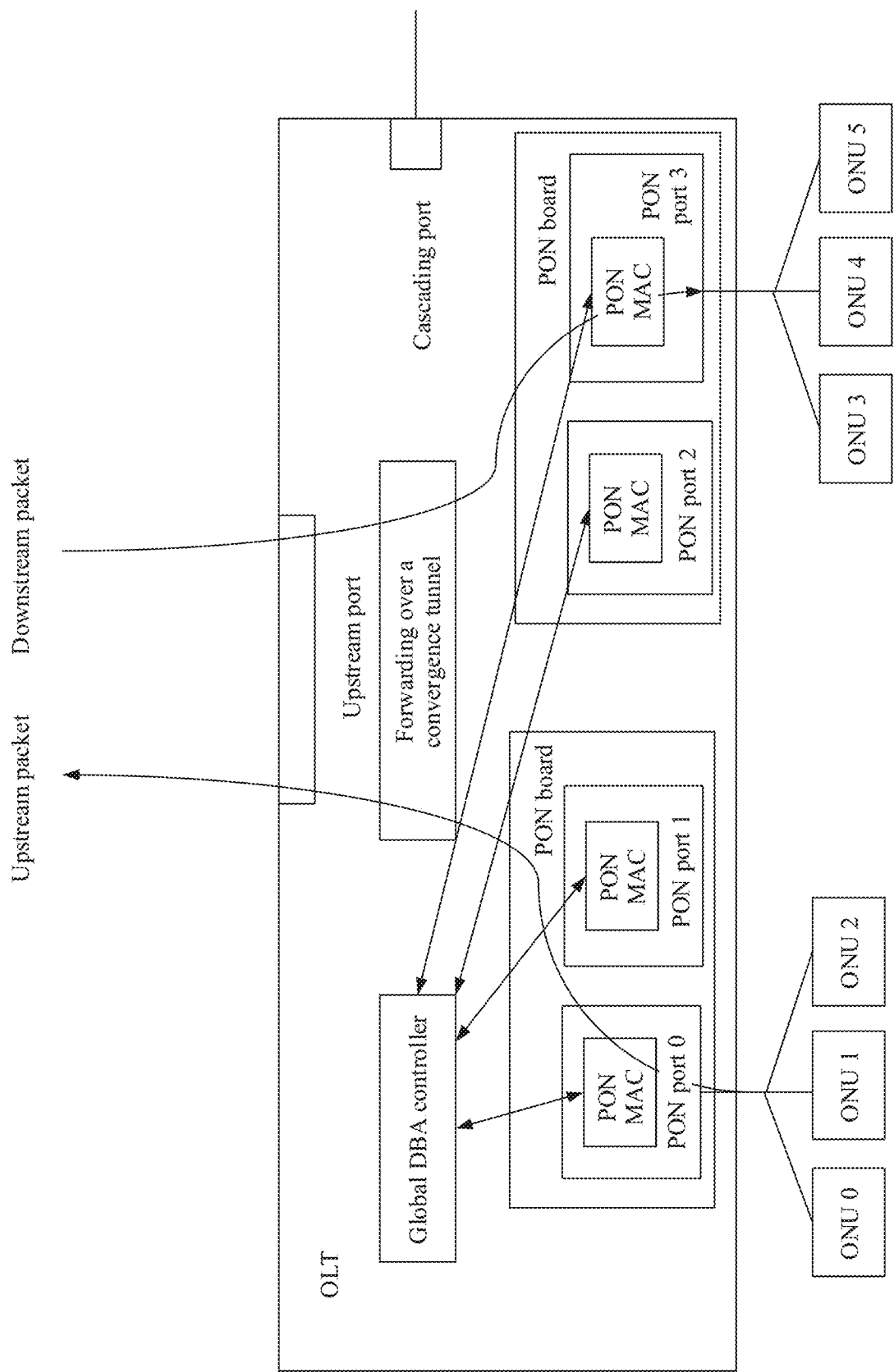
FIG. 3 is a schematic structural diagram of an optical line terminal according to an embodiment of this application.

In a specific embodiment, as shown in FIG. 3, an optical line terminal (OLT) and optical network units (ONU) form a PON network. In the PON network, the plurality of ONUs send bandwidth request messages and upstream packets (that is, service flow data) to the OLT through different PON ports. A global DBA controller in the OLT receives bandwidth request messages, performs global scheduling, allocates bandwidth information, and sends the allocated bandwidth information to the plurality of ONUs through the PON ports. The plurality of ONUs send the upstream packets on the allocated bandwidth information, and the OLT receives, through the PON ports, the upstream packets sent by all the ONUs, and sends, through an upstream egress, all the received upstream packets to an upper-level device (for example, a backbone network device such as a backbone edge router).

It may be understood that, in this embodiment of this application, the global DBA controller is disposed on the OLT to perform global scheduling and allocate the bandwidth information, so that a sum of bandwidth information requested by using the bandwidth request messages sent through all the PON ports can be accurately collected. In addition, according to a bandwidth limitation on the upstream egress of the OLT and a service QoS policy, global bandwidth information allocation and token authorization are performed for the bandwidth request messages sent by all the ONUs, to ensure that bandwidth information occupied by total traffic of an upstream ingress does not exceed limited bandwidth information of the upstream egress of the OLT, and that neither congestion nor an internal packet loss in upstream occurs. In this way, functional components such as a TM chip of the PON board, a TM chip of the upstream board, and the off-chip DDR buffer can be deleted, reducing costs and power consumption of the entire network system.

Embodiments of this application relate to a bandwidth request device. The bandwidth request device may be a user-side entity configured to receive or transmit a signal, for example, an optical network unit (ONU), a cable modem (CM), or a station (STA) in a wireless local area network (WLAN). The bandwidth request device may alternatively be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal device in a next-generation communications system, for example, a fifth-generation communications (5G) network, a terminal device in a future evolved public land mobile network (PLMN) network, a terminal device in a new radio (NR) communications system, or the like. By way of example but not limitation, the bandwidth request device in the embodiments of this application may alternatively be a wearable device. The wearable device may also be referred to as a wearable intelligent device, and is a general term for wearable devices, such as glasses, gloves, watches, clothes, and shoes, that are developed by applying wearable technologies to intelligent design of daily wear. The wearable device is a portable device that is directly worn on a body or incorporated into clothes or an accessory of a user. The wearable device is not only a hardware device, but also implements a strong function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

Embodiments of this application further relate to a network convergence device. The network convergence device may be an entity configured to transmit or receive a signal, for example, an optical line terminal (OLT), a cable modem termination system (CMTS), a switch, a router, or an access point (AP) in a WLAN. The network convergence device may alternatively be a base transceiver station (BTS) in a global system for mobile communications (GSM) or code division multiple access (CDMA); may be a NodeB (NB) in wideband code division multiple access (WCDMA); or may be an evolved NodeB (eNB or eNodeB) in Long Term Evolution (LTE), a relay station, an access point, a vehicle-mounted device, a wearable device, a network device in a future 5G network, a network device in a future evolved public land mobile network (PLMN), a gNodeB in an NR system, or the like. In a scenario of a multi-layer convergence network, the network convergence device may be used as a level-2 convergence network device.

An embodiment of this application further relates to a core network (namely, a backbone network) device. For example, the core network device may be an edge router; or may be a broadband remote access server (BRAS), a broadband network gateway, a serving GPRS support node (SGSN), a gateway GPRS support node (GGSN), a mobility management entity (MME), a serving gateway (S-GW), or the like. In a scenario of a multi-layer convergence network, the backbone network device (the edge router of the backbone network) may be used as a one-level convergence network device.

An embodiment of this application further relates to a control and management device. The control and management device may be a device that performs centralized control and management on forwarding devices (for example, a router and a switch) in a network.

Figure 4:
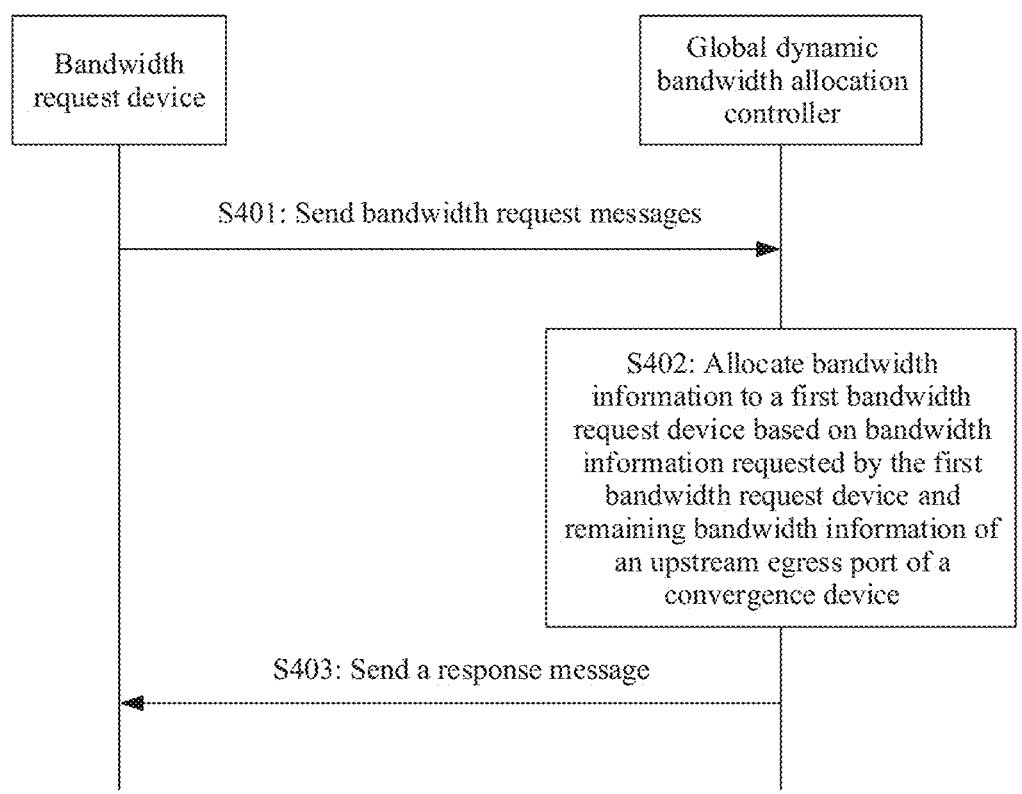
FIG. 4 is a schematic flowchart of a dynamic bandwidth allocation method according to an embodiment of this application.

FIG. 4 is a schematic flowchart of a dynamic bandwidth allocation method according to an embodiment of this application. As shown in FIG. 4, the method includes but is not limited to the following steps:

S401: A dynamic bandwidth allocation controller receives bandwidth request messages from bandwidth request devices through at least two access ports of a convergence device. The bandwidth request messages include a first bandwidth request message from a first bandwidth request device received through a first access port of the convergence device, and the first bandwidth request message includes bandwidth information requested by the first bandwidth request device.

Specifically, the bandwidth request device sends a bandwidth request message through an access port of a network convergence device. A media access controller (MAC) in the network convergence device receives the bandwidth request message and sends the bandwidth request message to a global dynamic bandwidth allocation (DBA) controller. The network convergence device may include one or more access ports, and each access port may be connected to one or more bandwidth request devices. Optionally, the global DBA controller may be deployed inside the network convergence device, the access port may be a PON interface or a radio frequency (RF) interface, and the network convergence device may be an OLT, an AP, or a switch.

In a specific embodiment, if a plurality of network convergence devices are cascaded, the bandwidth request device may send the bandwidth request message to the global DBA controller through cascading ports.

Specifically, when the plurality of network convergence devices are connected through cascading ports, and the global DBA controller is deployed inside only one of the network convergence devices, the global DBA controller may dynamically allocate bandwidth information for bandwidth request messages sent through access ports of all the cascaded network convergence devices.

For example, in a PON network, there are two OLTs: an OLT 1 and an OLT 2. The two OLTs are connected through cascading ports. One or more line card PON boards (that is, user boards) exist in each of the OLT 1 and the OLT 2. Each PON board includes one or more medium access control chips (that is, PON MAC chips). Each PON MAC correspondingly supports one access port (that is, a PON port). Each PON board may receive, through a PON port, a bandwidth request message or bandwidth request messages sent by one or more ONUs. A global DBA controller and an upstream board exist in the OLT 1, and all upstream packets can be transmitted through the upstream board to an upper-level device from the upstream port. The PON MAC chip identifies, according to a PON protocol, a bandwidth request message that is sent by an ONU and that is received through a PON port, and directly sends the bandwidth request message to the global DBA controller. However, no global DBA controller exists in the OLT 2. If a PON port of the OLT 2 receives a bandwidth request message sent by an ONU, the OLT 2 needs to send the received bandwidth request message to the OLT 1 through a cascading port, then the received bandwidth request information is sent to the global DBA controller, and the global DBA controller processes and allocates bandwidth information.

It should be noted that an interface protocol between the PON board and the ONU is completely compatible with an existing PON protocol, and there is no need to replace or adjust the ONU. In addition, the first herein is intended only to distinguish between different access ports and between different bandwidth request devices, and does not constitute a specific limitation.

S402: The global DBA controller allocates bandwidth information to the first bandwidth request device based on the bandwidth information requested by the first bandwidth request device and remaining bandwidth information of an upstream egress port of the convergence device. The remaining bandwidth information is a difference between limited bandwidth information of the upstream egress port and bandwidth information already allocated before the first bandwidth request message is received.

It should be noted that the limited bandwidth information of the upstream egress port of the convergence device may be preset or fixedly configured, or may be dynamically allocated by a higher-level global DBA controller.

Optionally, the bandwidth information may be length information of bytes allowed to be sent, or may be time slice information. It should be noted that the sum of bandwidth information and/or the difference between bandwidth information in this application are/is a comparison result between parameters of a same type. For example, the difference between the limited bandwidth information of the upstream egress port and the bandwidth information already allocated before the first bandwidth request message is received may be a difference between a length of bytes that are allowed to be sent and that are limited by the upstream egress port, and a length of allocated bytes; or is a difference between a length of a time slice limited and allocated by the upstream egress port and a length of an allocated time slice.

S403: The global DBA controller sends a response message to the first bandwidth request device through the first access port, where the response message includes the bandwidth information allocated to the first bandwidth request device.

Optionally, the global DBA controller sends a response message to the network convergence device through cascading ports. After receiving the response message, the network convergence device sends the response message to the bandwidth request device through the first access port.

Further, the global DBA controller may be physically separated from the network convergence device. The global DBA controller may encapsulate the allocated bandwidth information according to a standard protocol (for example, an Ethernet protocol), and then send encapsulated bandwidth information to the network convergence device, to flexibly deploy the network convergence device and the bandwidth request device.

In this embodiment of this application, upstream congestion and an upstream packet loss do not occur on the network convergence device. Specifically, the global DBA controller may accurately collect a sum of bandwidth information requested by using the upstream bandwidth request messages sent through all the access ports, perform hierarchical quality of service (HQoS) multi-level scheduling and bandwidth control based on the remaining bandwidth information of the upstream egress port of the convergence device, perform scheduling and global allocation for all bandwidth request messages, and perform token authorization, to ensure that bandwidth information occupied by total upstream traffic entering an access network is less than or equal to the limited bandwidth information of the upstream egress port, and that bandwidth information allocated to an internal port at each level is less than or equal to configured bandwidth information of an upstream egress of the port at the level. In this way, congestion does not occur in upstream and no internal packet loss occurs in upstream, and a structure of a network convergence device or a chip can be simplified (for example, a functional component such as a TM module or a switch may be deleted), thereby reducing costs and power consumption of the entire network.

It should be noted that step S401 to step S403 in the foregoing method embodiment are merely schematically summarized. For specific implementation process of the steps, refer to the following descriptions of the embodiments in FIG. 5 to FIG. 10. For example, in step S401, the bandwidth request messages sent by the bandwidth request devices may be received and processed based on a structure of a global DBA controller described in FIG. 5 and a structure of a bandwidth request message processing unit shown in FIG. 6. Step 402 may further include global queue management and scheduling based on FIG. 7 and FIG. 8, and a process of allocating a bandwidth without a burst in FIG. 10 based on a structure of a bandwidth allocation unit shown in FIG. 9. In step S403, a bandwidth allocation information distribution unit may distribute bandwidth information based on a structure of a global DBA controller shown in FIG. 5.

Figure 5:
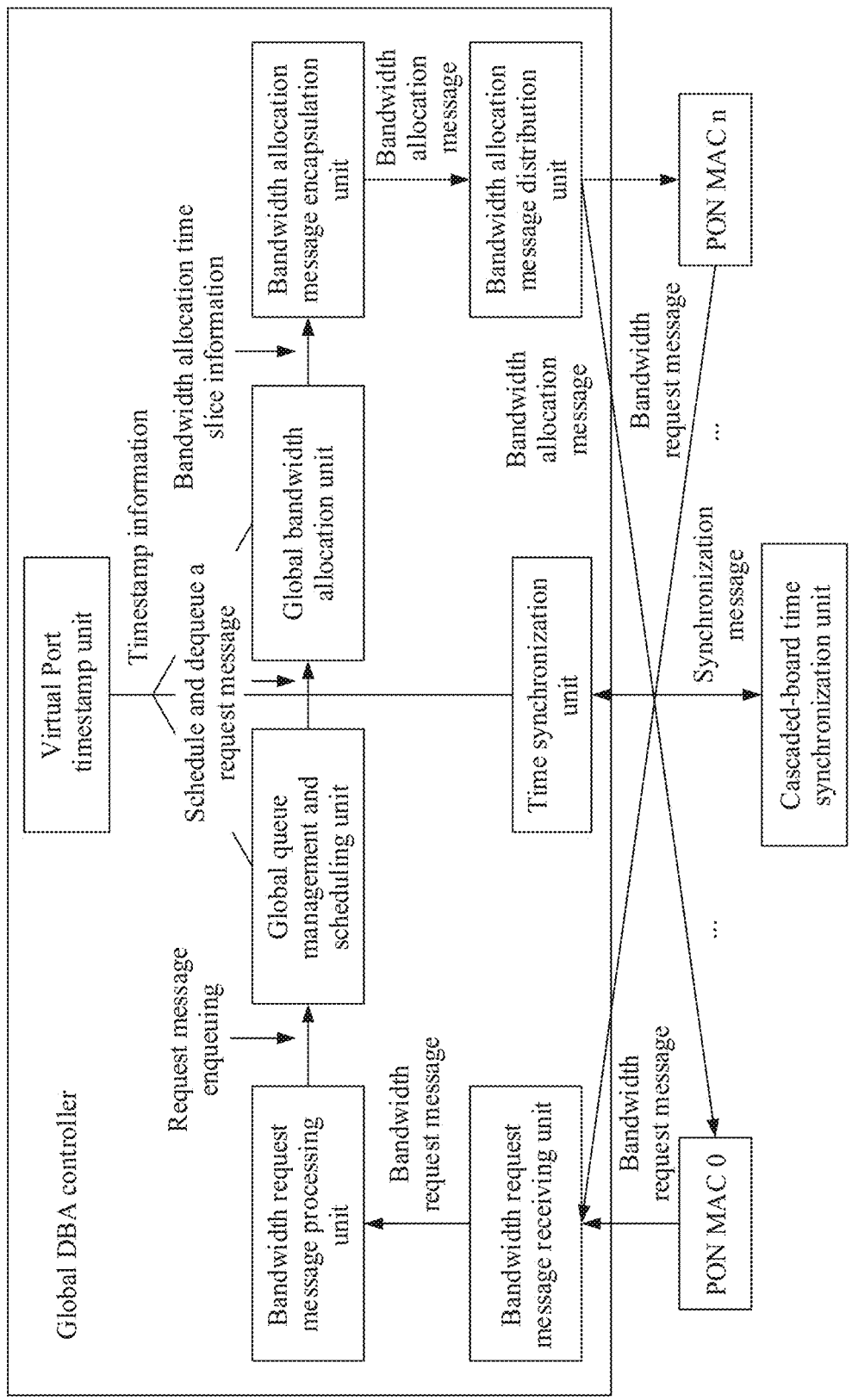
FIG. 5 is a schematic structural diagram of a global dynamic bandwidth allocation controller according to an embodiment of this application.

FIG. 5 is a schematic structural diagram of a global DBA controller according to an embodiment of this application. As shown in FIG. 5, the global DBA controller may include a bandwidth request message receiving unit, a bandwidth request message processing unit, a global queue management and scheduling unit, a global bandwidth allocation unit, a bandwidth allocation message encapsulation unit, a bandwidth allocation message distribution unit, a virtual port timestamp unit, and a time synchronization unit.

The bandwidth request message receiving unit receives a bandwidth request message sent by a bandwidth request device. For example, in a PON network, the bandwidth request message receiving unit receives bandwidth request messages sent by all bandwidth request devices (ONUs) through PON ports and PON MAC chips. The PON ports and the PON MAC chips may be located in one network convergence device (OLT) or in different network convergence devices connected through the cascading ports. After receiving the bandwidth request message, the bandwidth request message receiving unit sends the bandwidth request message to the bandwidth request message processing unit. The bandwidth request message processing unit processes the bandwidth request message and sends a processed request message to the global queue management and scheduling unit, to implement a request message enqueueing operation. After being scheduled by the global queue management and scheduling unit, the scheduled request message is sent to the global bandwidth allocation unit, to implement a request message dequeueing operation. The global bandwidth allocation unit calculates, based on the scheduled request message, a time slice of a physical channel that needs to be occupied by bandwidth information requested by using the bandwidth request message, to implement a bandwidth allocation function; and sends, to the bandwidth message encapsulation unit, result information indicating that allocation is completed. The bandwidth allocation message encapsulation unit encapsulates the result information indicating that allocation is completed, sends an encapsulated bandwidth allocation message to the bandwidth allocation message distribution unit for distribution, and sends the bandwidth allocation message to the bandwidth request device.

In particular, in a process in which the global queue management and scheduling unit schedules the request message out of the queue and the global bandwidth allocation unit allocates the bandwidth information to the request message, the virtual port timestamp unit virtualizes all the access ports into one logical port, and evenly allocates the bandwidth information on the logical port. A start time of each time slice allocated by each actual access port to the bandwidth request message is controlled to be close to that of the logical port, so as to implement a function of evenly allocating the bandwidth information without a burst. Bandwidth information of the logical port is equal to the remaining bandwidth information of the upstream egress port.

The time synchronization unit ensures that a timestamp of the bandwidth request device is consistent with that of the global DBA controller. Especially when there are cascaded network convergence devices, time synchronization is implemented between the cascaded network convergence devices, and the bandwidth request device and the global DBA controller, to ensure timestamp consistency and globally allocate all bandwidth information. For example, in a PON network, cascaded OLTs and cascaded PON MAC chips exist, and a time synchronization unit implements time synchronization between all PON ports and a master chip of a global DBA controller, to ensure that the global DBA controller can allocate bandwidth information to ONUs connected to all the PON ports.

It should be noted that the structure of the global DBA controller and the bandwidth information allocation process are merely used as examples, and should not constitute a specific limitation. Units in the global DBA controller may be added, deleted, or combined as required.

Based on the structure of the global DBA controller shown in FIG. 5, the following describes each unit module and a bandwidth information allocation process in detail.

In a specific embodiment of this application, the global DBA controller receives, through a cascading port, a request packet sent by the bandwidth request device, and parses the request packet to obtain the bandwidth request message carried in the request packet.

Optionally, the request packet may be a standard Ethernet (the Ethernet, ETH) packet transmitted according to an Ethernet protocol or a standard packet transmitted according to another protocol. This is not specifically limited herein. The cascading port herein may be an Ethernet interface or another standard interface, and is not specifically limited herein.

Specifically, in the PON network, the bandwidth request message receiving unit of the global DBA controller receives the bandwidth request messages sent by all the ONUs through the PON ports and the PON MAC chips. If the PON MAC chips and the global DBA controller are in a same network convergence device (for example, an OLT), the PON MAC chips directly send the bandwidth request messages to the bandwidth request message receiving unit. If the PON MAC chips are in another network convergence device (another OLT) cascaded with a network convergence device in which the global DBA controller is located, the PON MAC chips need to encapsulate the bandwidth request messages into a standard packet (for example, an ETH packet), and send the standard packet to the bandwidth request message receiving unit through a cascading port (an Ethernet port). After receiving the bandwidth request message, the bandwidth request message receiving unit parses the bandwidth request message according to a corresponding standard protocol (for example, an ETH protocol), to obtain the bandwidth request messages encapsulated in the standard packet, and sends the bandwidth request messages obtained through parsing to the bandwidth request message processing unit.

It may be understood that the PON MAC chips carry the bandwidth request messages in the standard Ethernet packets or other standard packets. The packets are transmitted through the Ethernet or another intermediate network, to arrive at an Ethernet interface or another standard interface of a network convergence device in which the global DBA controller is located, and then arrive at the bandwidth request message receiving unit. In this way, bandwidth request devices can be deployed flexibly, and a coverage of the global DBA controller is expanded.

In a specific embodiment of this application, after a first bandwidth request message sent by a first bandwidth request device is received, bandwidth information requested by using the first bandwidth request message is determined. If the bandwidth information requested by using the first bandwidth request message is greater than a second threshold, a plurality of bandwidth request sub-messages are generated based on the bandwidth information requested by using the first bandwidth request message. A sum of bandwidth information requested by using the plurality of bandwidth request sub-messages is equal to the bandwidth information requested by using the first bandwidth request message.

If the bandwidth information requested by using the first bandwidth request message is less than a third threshold, the first bandwidth request message is blocked, a second bandwidth request message sent by the first bandwidth request device continues to be received, and the first bandwidth request message and the second bandwidth request message are reassembled to obtain a reassembled bandwidth request message. Bandwidth information requested by using the reassembled bandwidth request message is equal to a sum of the bandwidth information requested by using the first bandwidth request message and bandwidth information requested by using the second bandwidth request message.

When the bandwidth information requested by using the reassembled bandwidth request message is greater than a fourth threshold, bandwidth information is allocated to the first bandwidth request device based on the bandwidth information requested by using the reassembled bandwidth request message and the remaining bandwidth information of the upstream egress port of the convergence device; or when a waiting time is greater than a fifth threshold, the first bandwidth request message is unblocked.

Optionally, the second threshold, the third threshold, the fourth threshold, and the fifth threshold may be configured in advance by the global DBA controller based on actual requirements.

Figure 6:
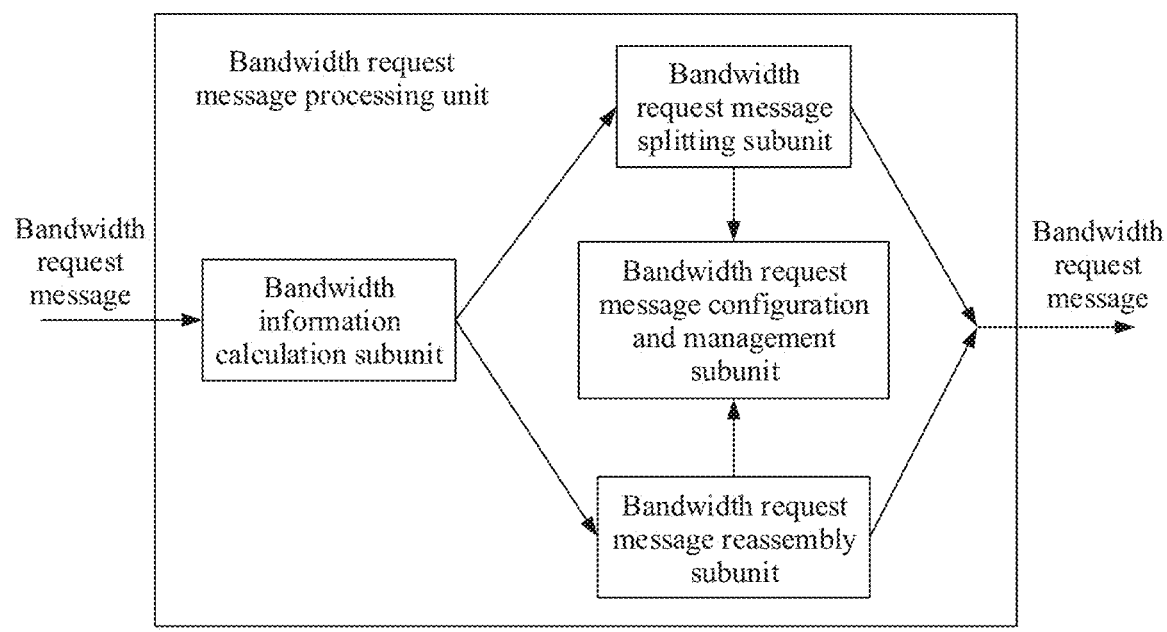
FIG. 6 is a schematic structural diagram of a bandwidth request message processing unit according to an embodiment of this application.

In a specific embodiment, referring to FIG. 6, FIG. 6 is a schematic structural diagram of a bandwidth request message processing unit according to an embodiment of this application. As shown in FIG. 6, the bandwidth request message processing unit includes a bandwidth information calculation subunit, a bandwidth request message splitting subunit, a bandwidth request message reassembly subunit, and a bandwidth request message configuration and management subunit.

Specifically, after the bandwidth request message processing unit receives a raw bandwidth request message (that is, an unprocessed request message sent by a user) sent by the bandwidth request message receiving unit, the bandwidth information calculation subunit needs to calculate bandwidth information actually requested by the raw bandwidth request message. Further, because network protocols are different, bandwidth request messages sent by users are also different. For example, some users carry real-time depth information of bandwidth information in bandwidth request messages, and some users carry incremental information of bandwidth information in bandwidth request messages. The global DBA controller needs to perform identification on a network protocol on which a received bandwidth request message is based, and determine, according to an identified corresponding network protocol, whether the bandwidth request message carries real-time depth information of bandwidth information or incremental information of bandwidth information. For example, if the global DBA controller determines, according to a network protocol, that the bandwidth request message carries real-time depth information of bandwidth information, the global DBA controller needs to calculate, according to the real-time depth information of the bandwidth information, an increment of requested bandwidth information based on a series of specific bandwidth information calculation methods. The increment is bandwidth information of which allocation actually needs to be requested. If the global DBA controller determines, according to the network protocol, that the bandwidth request message carries increment information of the bandwidth information, the global DBA controller may directly perform calculation to obtain an increment of requested bandwidth information, so as to obtain bandwidth information of which allocation actually needs to be requested.

For example, an ONU 1 sends, according to a PON protocol through a PON port, a bandwidth request message to an OLT in which the global DBA controller is located. The bandwidth request message carries real-time depth information of bandwidth information, to be specific, 50 M. If the ONU 1 does not obtain bandwidth information through allocation in a timely manner, the ONU 1 continues to send the bandwidth request message. It is assumed that real-time depth information is still 50 M. In this case, the global DBA controller starts to process the bandwidth request message sent by the ONU 1. Because the ONU 1 sends the real-time depth information of the bandwidth information, the global DBA controller determines, through calculation, that the bandwidth information requested by the ONU 1 is 50 M. A CM 1 sends a bandwidth request message to the global DBA controller according to a DOCSIS protocol, where the bandwidth request message carries increment information of requested bandwidth information, and the bandwidth information is 50 M. If the CM1 receives no acknowledgment message sent by the global DBA controller, the CM 1 needs to send a new upstream packet, needs to request bandwidth information to be allocated, and sends a bandwidth request message again to request bandwidth allocation information to be allocated. It is assumed that the bandwidth allocation information is still 50 M. When the global DBA controller processes the bandwidth request message sent by the CM 1, because the CM 1 sends increment information of bandwidth information, the global DBA controller determines, through calculation, that the bandwidth information requested by the CM 1 is 100 M.

It can be learned that the bandwidth information calculation subunit calculates the bandwidth information, so that bandwidth information actually requested by the user can be obtained more accurately, so as to facilitate subsequent processing and bandwidth information allocation, and improve bandwidth utilization.

After the bandwidth information calculation subunit calculates bandwidth information actually requested by the user, further determining needs to be performed on the bandwidth information. For example, if the actually requested bandwidth information is 300 M, and the second threshold is 100 M, the bandwidth request message splitting subunit splits the bandwidth information requested by using the bandwidth request message. For example, the bandwidth request message splitting subunit splits a bandwidth request message whose requested bandwidth information is 300 M, to obtain three bandwidth request sub-messages. Bandwidth information requested by using each bandwidth request sub-message is 100 M. It should be understood that the bandwidth information requested by using the bandwidth request message may be evenly split to obtain a plurality of bandwidth request sub-messages whose requested bandwidth information is equal to each other, or may be split according to another splitting rule. In addition, a maximum value of bandwidth information requested by using each bandwidth request sub-message obtained after the splitting may be configured based on a requirement. The foregoing splitting manner is merely an example, and should not constitute a specific limitation.

It may be understood that the bandwidth request message splitting subunit splits the bandwidth request message. That is, when the bandwidth information requested by using the bandwidth request message is excessively large, the request message is split to obtain a plurality of pieces of bandwidth request sub-information. A sum of bandwidth information requested by using the plurality of bandwidth request sub-messages is equal to the bandwidth information requested by using the original bandwidth request message. In this way, a comparatively large burst generated in the entire system because an excessively long time slice is allocated to a single bandwidth request message can be avoided, and impact on a timely response to a bandwidth request message sent by another user with a higher priority can be further avoided.

In a further determining process, if the actually requested bandwidth information is 10 M, a third threshold is 30 M, and it is further determined that the bandwidth request message is sent by a non delay-first user, the bandwidth request message reassembly subunit performs a reassembly process for the bandwidth request message, temporarily blocks transmission of the bandwidth request message, and waits for arrival of another bandwidth request message sent by the user subsequently. If the user sends other two bandwidth request messages subsequently, and bandwidth information correspondingly requested by using the bandwidth request messages is 20 M and 25 M, the request message reassembly subunit reassembles all the bandwidth request messages sent by the user to obtain one bandwidth request message. Bandwidth information correspondingly requested by using the bandwidth request message is 55 M. It is assumed that a fourth threshold is 50 M. In this case, the bandwidth information requested by using the reassembled bandwidth request message is greater than the fourth threshold, and the bandwidth request message reassembly subunit sends the reassembled bandwidth request message to the global queue management and scheduling unit. It should be noted that, when the bandwidth request message reassembly subunit performs the reassembly process for the bandwidth request message, a timeout control timer needs to be started. If the user does not send a subsequent bandwidth request message in the waiting process, or bandwidth information correspondingly requested by using a bandwidth request message obtained after sent bandwidth request messages are reassembled is still less than the fourth threshold, and a waiting time length exceeds a fifth threshold, where it is assumed that the fifth threshold is 20 milliseconds, after the waiting time length exceeds 20 milliseconds, the bandwidth request message reassembly subunit stops waiting, terminates the reassembly process, and immediately sends the reassembled bandwidth request message to the global queue management and scheduling unit. It should be understood that the foregoing reassembly rule, threshold setting, and the like may be configured based on an actual requirement, and the foregoing reassembly manner is merely used as an example, and should not constitute a specific limitation.

It may be understood that the bandwidth request message reassembly subunit reassembles bandwidth request messages. That is, a request message is blocked when bandwidth information requested by using the bandwidth request message is excessively small. After requested bandwidth information accumulates and exceeds a preset threshold or after a time expires, reassembly stops and unblocking is performed. This can reduce system overheads, avoid a waste of bandwidth information caused by allocating an excessively small time slice to a single bandwidth request message, and avoid a case in which a bandwidth request message whose requested bandwidth information is excessively small is not responded to for a long time.

It should be noted that, in a process in which the bandwidth request message splitting subunit splits the bandwidth request message or the bandwidth request message reassembly subunit reassembles the bandwidth request messages, the bandwidth request message configuration and management subunit needs to configure and manage parameter information and a specific process of the bandwidth request message. For example, the bandwidth request message configuration and management subunit may configure and maintain a maximum value of bandwidth information requested by using bandwidth request sub-messages that allow to be obtained through splitting, configure and maintain a maximum value of bandwidth information requested by using a reassembled bandwidth request message that allows to be obtained after reassembly, configure and maintain a timeout control time length.

It may be understood that, because the bandwidth request message configuration and management subunit configures and manages the splitting and reassembly process, the bandwidth request message may be split or reassembled, thereby improving efficiency of an entire splitting or reassembly process.

In a specific embodiment of this application, bandwidth information allocated by the global DBA controller to the first bandwidth request device through a first-level port is less than or equal to configured bandwidth information of an upstream egress of the first-level port; bandwidth information allocated by the global DBA controller to the first bandwidth request device through a second-level port is less than or equal to configured bandwidth information of an upstream egress of the second-level port; and the first-level port is higher than the second-level port, and the bandwidth information allocated to the first bandwidth request device through the first-level port is less than or equal to remaining bandwidth information of an upstream egress port of the convergence device.

It should be noted that the first-level port and the second-level port are intended only to indicate that levels of the first-level port and the second-level port are different, and do not constitute a specific limitation. The global DBA controller may include more levels of scheduling ports, and may be set as required.

Figure 7:
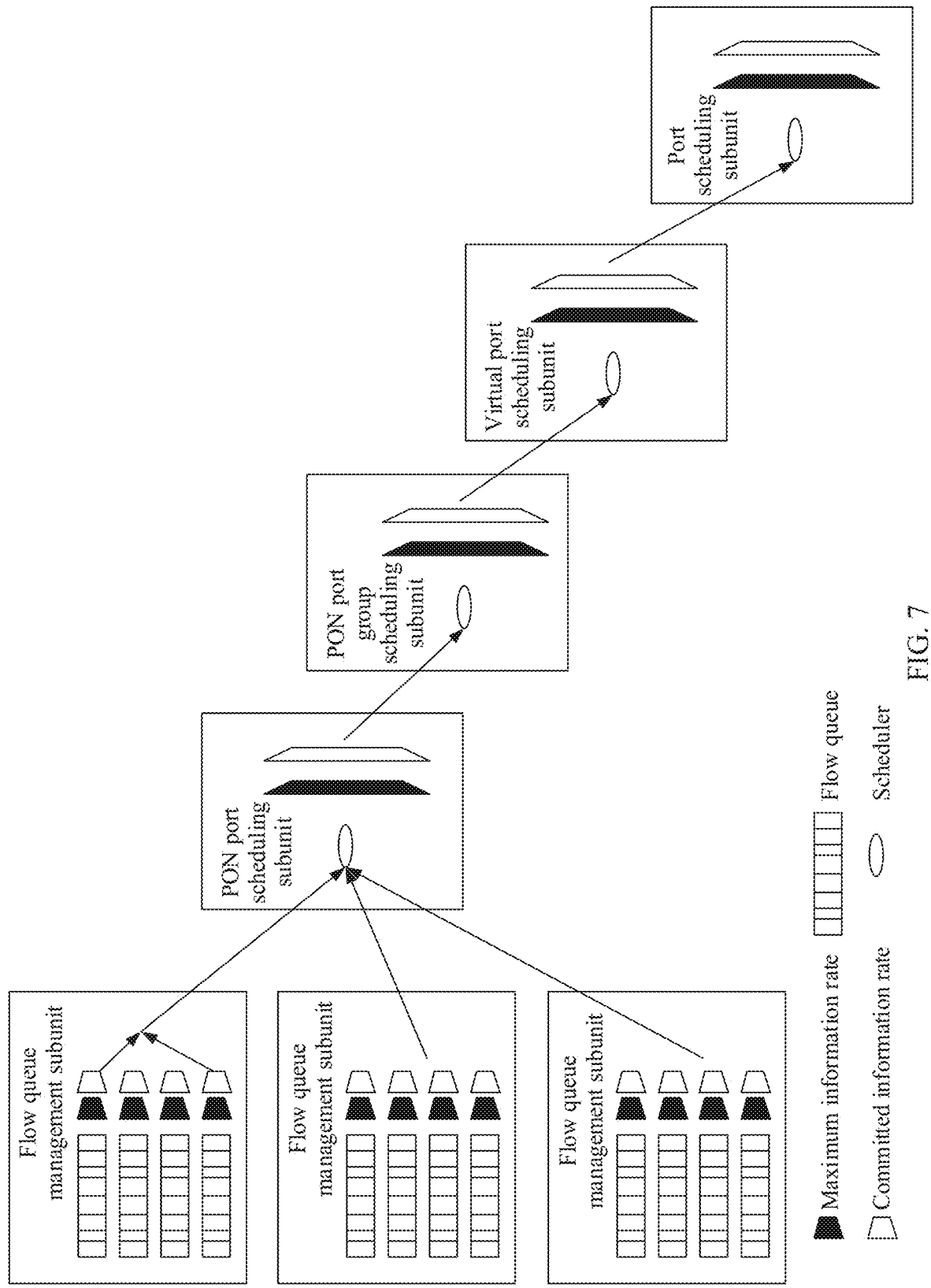
FIG. 7 is a schematic structural diagram of a global queue management and scheduling unit according to an embodiment of this application.

In a specific embodiment, referring to FIG. 7, FIG. 7 is a schematic structural diagram of a global queue management and scheduling unit according to an embodiment of this application. As shown in FIG. 7, the global queue management and scheduling unit includes a port scheduling subunit, a virtual port scheduling subunit, a PON port group scheduling subunit, a PON port scheduling subunit, and a flow queue management subunit. Scheduling levels corresponding to the port scheduling subunit, the virtual port scheduling subunit, the PON port group scheduling subunit, the PON port scheduling subunit, and the flow queue management subunit are in descending order. A scheduling level of the port scheduling subunit is the highest, and the port scheduling subunit is directly connected to an upstream egress port. A scheduling level of the flow queue management subunit is the lowest, and the flow queue management subunit is directly connected to a user.

It should be noted that the first-level port and the second-level port are only relative concepts, and only indicate that a level of the first-level port is higher than that of the second-level port. For example, a PON port group port is a second-level port relative to a virtual port, but a first-level port relative to a PON port. The virtual port is a level-2 port relative to a port.

Specifically, a bandwidth occupied by a port scheduling subunit for overall scheduling traffic does not exceed remaining bandwidth information of an upstream egress port of an OLT or a router, that is, bandwidth information allocated by the port scheduling subunit to a plurality of virtual ports is less than or equal to the remaining bandwidth information of the upstream egress port of the router. If the global DBA controller is deployed on a router or a control and management device, the port scheduling subunit simultaneously performs scheduling on a plurality of lower-level virtual ports in a scheduling mode such as strict priority queueing (PQ), weighted round robin (WRR), or a combination of PQ and WRR.

Further, to solve a problem that a plurality of packets contend for resources at the same time, queue scheduling, such as PQ and WRR, is generally used. During queue scheduling, packets in a queue with a higher priority are sent preferentially in strict descending order of priorities in PQ. When a queue with a higher priority is empty, packets in a queue with a lower priority are sent. For delay- and jitter-sensitive applications, queue scheduling is performed in a priority mode, packets of key services, such as enterprise resource planning (ERP) and video services, are placed in a queue with a highest priority, to ensure that the packets always gain forwarding services preferentially. In WRR queue scheduling, each port is divided into a plurality of output queues, and the queues are scheduled in a polling manner to ensure that a specific service time is obtained for each queue. In WRR, a weight can be configured for each queue. The weight represents a proportion of an obtained resource. For example, there are four queues for a 100 M port: w3, w2, w1, and w0. Weights configured for the four queues and used in a WRR queue scheduling algorithm are 50, 30, 10, and 10. In this case, it can be ensured that a queue with a lowest priority obtains at least 10 M bandwidth. In this way, a disadvantage that packets in a low-priority queue may not be scheduled for a long time can be overcome. In addition, although the plurality of queues are scheduled in a polling manner, a service time slice is not fixedly allocated to each queue. When a specific queue is empty, scheduling of a next queue can be performed immediately, to ensure that bandwidth resources are fully used.

Figure 8:
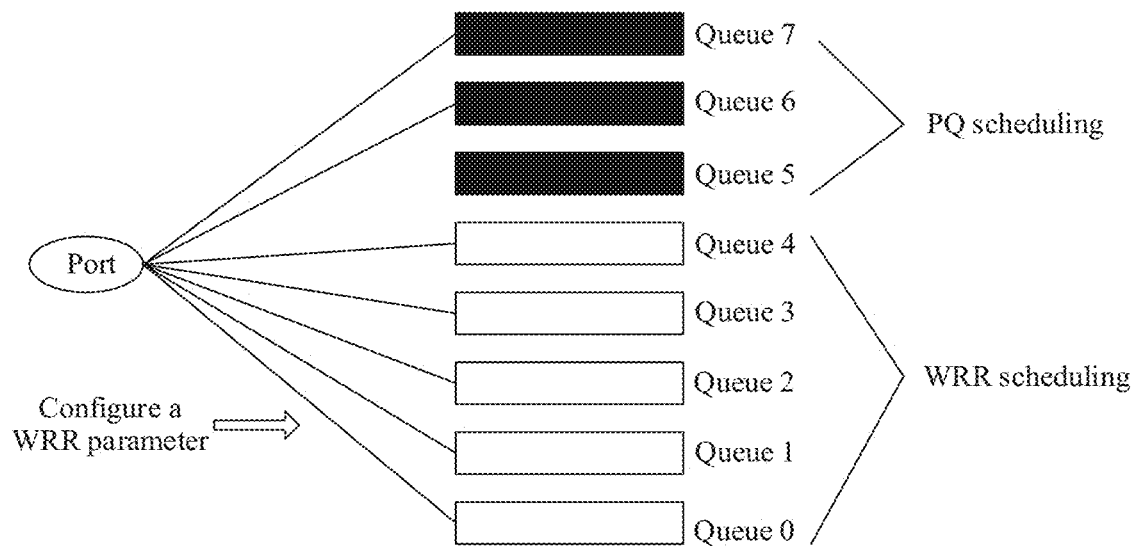
FIG. 8 is a schematic diagram of scheduling in combination with strict priority scheduling and weighted round robin scheduling according to an embodiment of this application.

FIG. 8 is a schematic diagram of scheduling in combination with strict priority scheduling and weighted round robin scheduling according to an embodiment of this application. As shown in FIG. 8, WRR parameters of queues may be pre-configured. Eight queues on a port are grouped into two groups according to the configuration. A first group includes a queue 7, a queue 6, and a queue 5, and PQ scheduling is used for the first group. A second group includes a queue 4, a queue 3, a queue 2, a queue 1, and a queue 0, and WRR scheduling is used for the second group. During specific scheduling, packet flows in the queue 7, the queue 6, and the queue 5 are first scheduled through PQ. After all the packet flows in all the queues in the first group are scheduled, packet flows in other queues start to be scheduled through WRR in a cyclic way. The queue 4, the queue 3, the queue 2, the queue 1, and queue 0 include respective weights. Important protocol packets and service packets with a short-delay requirement are placed in queues using PQ scheduling, so that the protocol packets and the service packets can be scheduled preferentially. Other packets are placed in queues using WRR scheduling.

In the scheduling mode combining PQ scheduling and WRR scheduling, packets in queues with lower priorities can obtain a bandwidth in a timely manner through WRR scheduling, and PQ scheduling can ensure that services with a short-delay requirement can be scheduled preferentially.

It should be noted that a priority of each queue is controlled by using a queue scheduling algorithm, and link layer priorities (for example, related stipulations in the 802.1Q protocol), upper-layer content (for example, information such as terms of service (TOS) fields, source addresses, destination addresses, source ports, or destination ports), or the like are used to distinguish between packet priorities. The queue scheduling algorithm and the priority distinguishing method are not specifically limited in this application.

The virtual port scheduling subunit is responsible for controlling bandwidth information occupied by scheduling traffic of each virtual port not to exceed configured bandwidth information of a scheduling egress of the virtual port, that is, bandwidth information allocated by the virtual port scheduling subunit to a plurality of PON port groups is less than or equal to the configured bandwidth information of the scheduling egress of the virtual port, and a plurality of lower-level PON port groups are scheduled in a scheduling mode such as PQ, WRR, or a combination of PQ and WRR.

It should be noted that the virtual port corresponds to a congestion port of a convergence network. For example, in a PON network, the virtual port may correspond to a congestion port into which a plurality of OLTs are converged when a global DBA controller is deployed in a router above an OLT or in a cloud. In particular, according to a network topology structure, a level-1 virtual port scheduling subunit or a multi-level virtual port scheduling subunit may be included. This is not specifically limited in this application.

The PON port group scheduling subunit is responsible for controlling bandwidth information occupied by scheduling traffic of each PON port group not to exceed configured bandwidth information of a scheduling egress of the PON port group, that is, bandwidth information allocated by the PON port group scheduling subunit to a plurality of PON ports is less than or equal to configured bandwidth information of the scheduling egress of the PON port group, and a plurality of lower-level PON ports are scheduled in a scheduling mode such as PQ, WRR, or a combination of PQ and WRR.

It should be noted that the PON port group may be applied to a cascading scenario, and corresponds to cascading ports for converging a plurality of PON ports. For example, when a plurality of PON ports of cascaded OLTs are converged together to transmit upstream data to an upper-layer device through a cascading port, a PON port group scheduling subunit needs to be deployed.

The PON port scheduling subunit is responsible for controlling bandwidth information occupied by scheduling traffic of each PON port to exceed configured bandwidth information of a scheduling egress of the PON port, that is, bandwidth information allocated by the PON port scheduling subunit to a plurality of ONUs is less than or equal to the configured bandwidth information of the scheduling egress of the PON port, and flow queues of a plurality of lower-level ONUs are scheduled in a scheduling mode such as PQ, WRR, or a combination of PQ and WRR.

It should be noted that the PON port scheduling subunit is a most basic scheduler composition unit, and a specific scheduling function of the PON port scheduling subunit corresponds to a function of a PON-based local DBA controller in an existing solution.

The flow queue management unit is responsible for controlling scheduling traffic of a service flow of each ONU not to exceed a configured bandwidth of each ONU, performing queue management on a bandwidth request message corresponding to the service flow, and supporting an enqueuing operation and scheduling and dequeuing operation of a lower-level scheduler.

It should be understood that division into the subunits of the global queue management and scheduling unit and division into the scheduling levels are merely examples, and should not constitute a specific limitation. The subunits or scheduling levels may be increased, deleted, or combined as required. In addition, a specific configuration (for example, configured bandwidth information of a scheduling egress) of each subunit may be configured as required. This is not limited in this application.

It can be learned that the global DBA controller allocates bandwidth information to the bandwidth request device hierarchically and performs bandwidth control, to ensure that the bandwidth information allocated to the bandwidth request device does not exceed limited bandwidth information of an upstream egress port of a convergence device. In addition, a bandwidth allocated to each port at each layer in the convergence device does not exceed configured bandwidth information of an upstream egress of the port at the level. In this way, it is ensured that congestion in upstream and an internal packet loss do not occur. In addition, a priority scheduling policy can be met, ensuring that higher-priority users obtain better services and bandwidth information.

In a specific embodiment of this application, the global DBA controller calculates overhead information based on physical channel attributes and the bandwidth information that is requested correspondingly by the bandwidth request message, and determines, based on the overhead information, a length of a time slice that needs to be allocated.

Specifically, after obtaining the bandwidth request message through scheduling, the global queue management and scheduling unit sends the bandwidth request message to the global bandwidth allocation unit. After receiving the bandwidth request message obtained through scheduling, the global bandwidth allocation unit calculates a length of a time slice of a physical channel that needs to be occupied by the requested bandwidth information, to implement a bandwidth allocation function.

Figure 9:
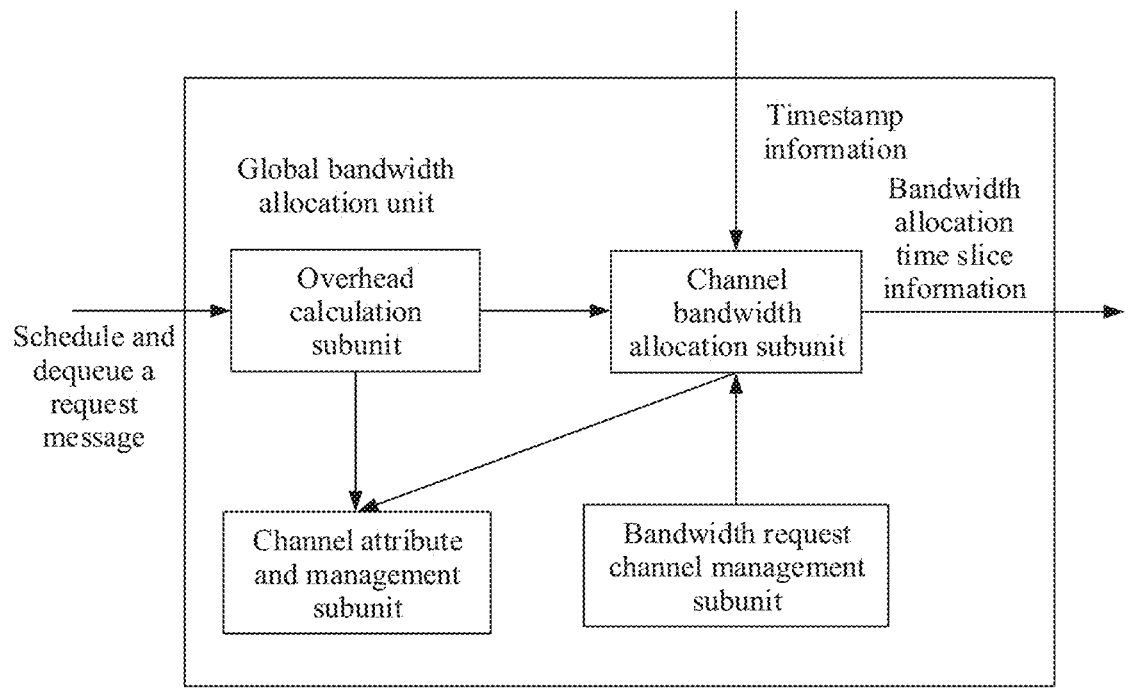
FIG. 9 is a schematic structural diagram of a global bandwidth allocation unit according to an embodiment of this application.

In a specific embodiment, referring to FIG. 9, FIG. 9 is a schematic structural diagram of a global bandwidth allocation unit according to an embodiment of this application. As shown in FIG. 9, the global bandwidth allocation unit includes an overhead calculation subunit, a bandwidth request channel management subunit, a channel bandwidth allocation subunit, and a channel attribute and resource management subunit.

Specifically, after receiving a bandwidth request message obtained by a global queue management and scheduling unit through scheduling, the overhead calculation subunit calculates overhead information based on actually requested bandwidth information corresponding to the request message and an actual attribute of a physical channel, and determines a length of a time slice of a physical channel that needs to be occupied by the requested bandwidth information and the overhead information. It should be understood that, if actual attributes of physical channels are different, calculated overhead information is different, and lengths of occupied time slices are also different.

Further, the bandwidth request channel management subunit generates a bandwidth request message required for managing and maintaining a physical channel. The message is usually generated based on software configurations, for example, initial ranging, periodic ranging, and fast Fourier transformation (FFT) spectrum scanning.

The channel bandwidth allocation subunit receives length information of a time slice sent by the overhead calculation subunit and the bandwidth request message sent by the bandwidth request channel management subunit; and allocates, on the physical channel based on an attribute of the physical channel, available actual remaining bandwidth information of the physical channel, and the like, the time slice and bandwidth information that is requested correspondingly by the bandwidth request message required for managing and maintaining the physical channel.

It should be noted that, in a process in which the overhead calculation subunit calculates the overhead information and the channel bandwidth allocation subunit allocates the bandwidth on the physical channel, the channel attribute and management subunit needs to configure and manage related parameters and specific processes, for example, a physical attribute used by software for channel configuration, and available bandwidth resource information allocated for maintaining a bandwidth.

It should be understood that the foregoing bandwidth allocation process is merely used as an example, and should not constitute a specific limitation. The subunits and the functions of the subunits may be added, deleted, or combined as required. This is not limited in this application.

In a specific embodiment of this application, a global DBA controller allocates bandwidth information of a logical access port to a first bandwidth request device, to obtain a startup time of a time slice obtained by the first bandwidth request device through allocation on the logical access port. The bandwidth information of the logical access port is equal to remaining bandwidth information of a upstream egress port. The global DBA controller allocates bandwidth information of the first access port to the first bandwidth request device based on the startup time, to obtain a start time of a time slice obtained by the first bandwidth request device through allocation on the first access port. A difference between the start time and the startup time is less than a first threshold.

Specifically, in a process in which the global bandwidth allocation unit allocates the bandwidth information, a virtual port timestamp unit runs an algorithm used for allocation without a burst, to virtualize all access ports of an entire system into one logical port, where bandwidth information of the logical port is equal to the remaining bandwidth information of the upstream egress port; evenly allocates bandwidth information on the logical port for all bandwidth request information obtained by the global queue management and scheduling unit through scheduling, so as to obtain timestamp information (that is, a startup time of each time slice); and sends the timestamp information to the channel bandwidth allocation subunit of the global bandwidth allocation unit, so that an actual start time of each time slice allocated to each actual physical access port is controlled to be close to that of the logical interface, and a function of evenly allocating a bandwidth without a burst is implemented.

Figure 10:
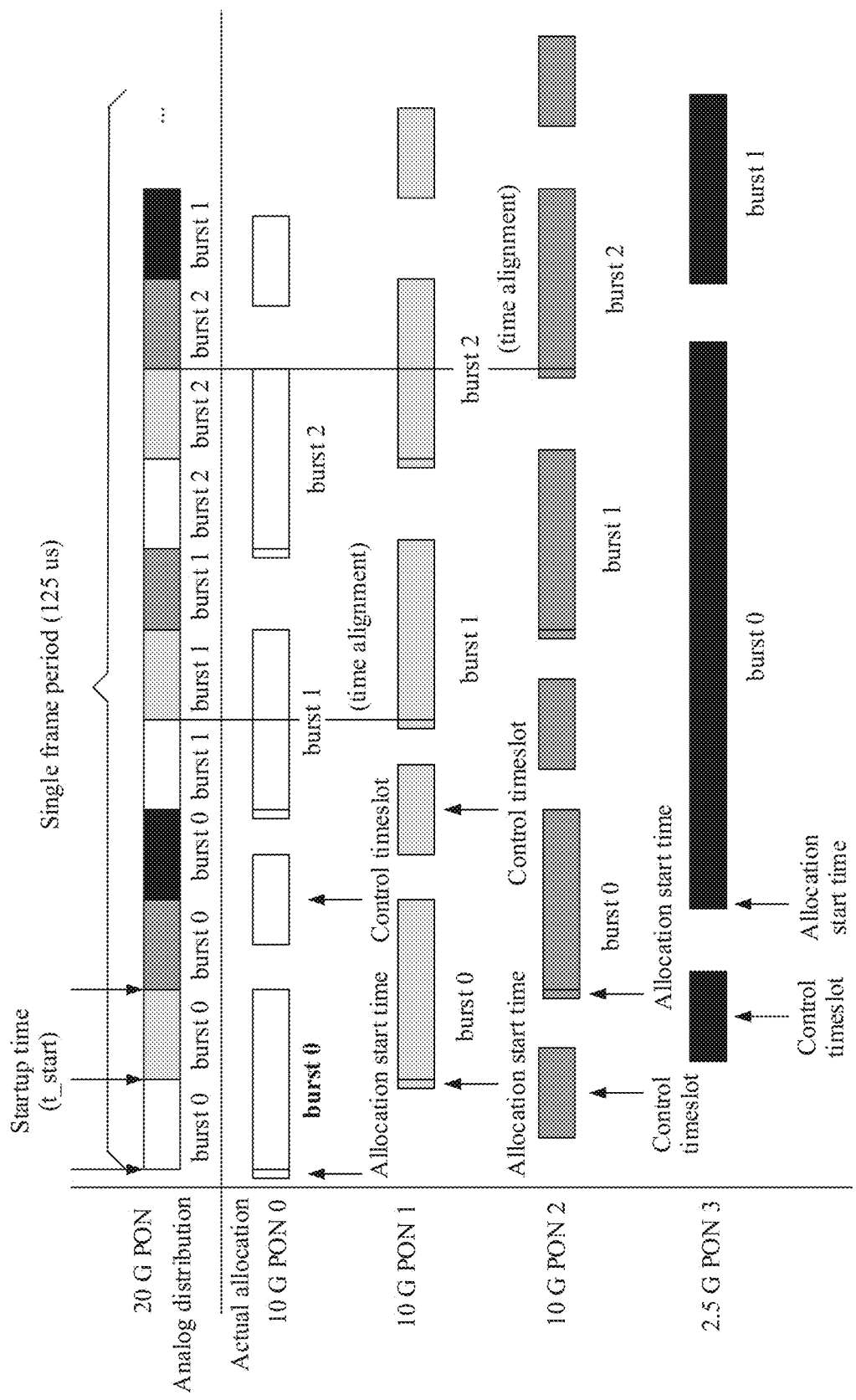
FIG. 10 is a schematic diagram of allocating a bandwidth without a burst according to an embodiment of this application.

In a specific embodiment, referring to FIG. 10, FIG. 10 is a schematic diagram of allocating a bandwidth without a burst according to an embodiment of this application. As shown in FIG. 10, it is assumed that there are four PON ports in a PON network: a PON 0, a PON 1, a PON 2, and a PON 3, capability bandwidths of the PON ports are 10 G, 10 G, 10 G, and 2.5 G, a limited bandwidth of an upstream egress port of an OLT corresponding to the PON ports is 20 G, that is, a bandwidth of a global logical PON port is 20 G, and a total quantity of bytes that can be allocated in a single frame (that is, one frame) period is calculated. For example, the single frame period is 125 microseconds. In this case, it can be calculated that a total quantity of bytes that can be allocated in the single frame period is 312.5 kilobytes; a length of a time slice occupied by each burst on the global logical PON port may be calculated based on the bandwidth of the global logical PON port and a length of each bandwidth request message (that is, a requested burst) obtained through scheduling, that is, a quantity of bytes that each request correspondingly requests to allocate; and the bandwidth information is allocated in the single frame period. Still further, a startup time (t_start) of each current burst on the global logical PON port is obtained by comparing a moment at which a bandwidth request message is obtained through scheduling with a simulated time at which a previous burst ends. For example, before the first burst ends, a next bandwidth request message is already obtained through scheduling. That is, if the moment at which the bandwidth request message is obtained through scheduling is earlier than a simulated time at which the first burst ends, the simulated time at which the first burst ends is used as t_start of the second burst. After the first burst ends, a next bandwidth request message is obtained through scheduling. That is, if the moment at which the bandwidth request message is obtained through scheduling is later than the simulated time at which the first burst ends, the moment at which the bandwidth request message is obtained through scheduling is used as t_start of the second burst.

After the t_start and a length of a time slice of each burst on the global logical PON port are obtained, bandwidth information requested correspondingly by a bandwidth request message is allocated to a physical PON port corresponding to the global logical PON port, and the global bandwidth allocation unit performs actual allocation and calculates overhead information, and an actual start time and a time slice length of each actually allocated time slice based on a capability bandwidth, a rate, and the like of each physical PON port. It should be noted that, because bandwidth information of the global logical PON port is not equal to capability bandwidth information of the physical PON port, for a same burst, a time slice length obtained through allocation on the global logical PON port is not equal to a time slice obtained through allocation on the physical PON port. For example, in FIG. 10, a capability bandwidth of the PON 0 is 10 G, and a bandwidth of the global logical PON port is 20 G. In this case, a length of a time slice occupied on the PON 0 by a burst 0 on the PON 0 is greater than a length of a time slice on the global logical PON port. A capability bandwidth of the PON 3 is 2.5 G, and in this case, a length of a time slice occupied on the PON 3 by the burst 0 on the PON 3 is greater than that of the time slice on the global logical PON port. In addition, on each physical PON port, there is a control timeslot between a plurality of bursts, for example, between a burst 0 and a burst 1 on the PON 0, and between a burst 0 and a burst 1 on the PON 1. The control timeslot is used to send a bandwidth request message of the PON port, so that bandwidth resources can be saved, and bandwidth utilization is improved.

After performing virtual allocation, a virtual port timestamp unit obtains corresponding timestamp information, that is, the t_start and the length of the time slice of each burst on the global logical PON port. In a process in which the global bandwidth allocation unit performs actual allocation after the timestamp information is sent to the global bandwidth allocation unit, it is ensured that a start time of a time slice allocated on each physical PON port to each burst and the t_start on the global logical PON port are less than a first threshold. In other words, the start time of the time slice allocated on each physical PON port to each burst needs to be aligned with the t_start on the global logical PON port. For example, in FIG. 10, a start time of the burst 1 on the PON 1 is aligned with t_start of the burst 1 on the global logical PON port, and a start time of a burst 2 on the PON 2 is aligned with t_start of the burst 2 on the global logical PON port. However, in actual implementation, complete alignment cannot be ensured. Therefore, a condition can be met provided that a difference between t_start and a start time is within the first threshold. The first threshold may be preconfigured by the global DBA controller. This is not limited in this application.

It may be understood that the virtual port timestamp unit executes the algorithm used for allocation without a burst, to evenly allocate all the bandwidth requests on the logical interface, so as to obtain timestamp information and send the timestamp information to the global bandwidth allocation unit. In this case, it is ensured that the global bandwidth allocation unit controls, based on the timestamp information, a start time of a time slice allocated on each physical access port to each bandwidth request message to be close to t_start of a logical port. In this way, upstream congestion and a packet loss can be avoided, where the upstream congestion and the packet loss are caused by a comparatively large burst bandwidth generated because all requested bandwidths are on the front part of each periodicity (for example, within the first half periodicity) in an actual allocation process due to a mismatch between physical access ports.

In a specific embodiment of this application, the global DBA controller sends the response message to the convergence device through a cascading port.

Specifically, after allocating bandwidth information to obtain time slice result information, the global bandwidth allocation unit sends the time slice result information to a bandwidth allocation message encapsulation unit, and the bandwidth allocation message encapsulation unit encapsulates the time slice result information according to a standard protocol to obtain a standard packet message, for example, encapsulates the time slice result information according to an Ethernet packet protocol to obtain a standard Ethernet packet. The cascading port herein is an Ethernet interface. It should be understood that the standard protocol may alternatively be another protocol, and the cascading interface is a corresponding standard interface. This is not specifically limited herein.

In a specific embodiment, the global DBA controller and a first PON MAC chip are in a same network convergence device (OLT). In this case, the bandwidth allocation message encapsulation unit in the global DBA controller encapsulates the time slice result information according to a frame format stipulated in a PON protocol, to obtain a packet message; and transmits the packet message in the network convergence device. The global DBA controller and a second PON MAC chip are not in a same network convergence device. In this case, the bandwidth allocation message encapsulation unit in the global DBA controller encapsulates the time slice result information at a specific time interval according to an Ethernet packet protocol to obtain a standard Ethernet packet, and transmits the standard Ethernet packet through an intermediate network (that is, an Ethernet network) to another network convergence device in which the second PON MAC chip is located.

It may be understood that the bandwidth allocation message encapsulation unit encapsulates the time slice result information according to the Ethernet packet protocol or another standard protocol to obtain the standard Ethernet packet or another standard packet, and may transmit the standard Ethernet packet or the another standard packet through the Ethernet network or another intermediate network to the Ethernet interface or another standard interface of the network convergence device, so as to arrive at a bandwidth request device. In this way, the bandwidth request device can be deployed flexibly, and a coverage of the global DBA controller is expanded.

In a specific embodiment of this application, the global DBA controller keeps time synchronization with the bandwidth request device according to a time synchronization protocol.

Specifically, the time synchronization unit needs to ensure that a timestamp of the bandwidth request device is consistent with that of the global DBA controller. Especially when there are cascaded network convergence device, the time synchronization unit implements time synchronization between the cascaded network convergence devices, and the global DBA controller and the bandwidth request device, to ensure timestamp consistency and globally allocate all bandwidth information.

For example, in the PON network, the time synchronization unit uses the 1588 time synchronization protocol to implement time synchronization between a global DBA master chip and the bandwidth request device (the OLT cascaded with the global DBA controller), so as to ensure timestamp consistency. It should be understood that the time synchronization unit may further use another time synchronization protocol or a user-defined protocol to implement time synchronization. This is not limited in this application.

It should be noted that, in the detailed description of the foregoing embodiment, an example in which the global DBA controller is deployed in the PON network is used for description. It should be understood that the global DBA controller may also be deployed in a P2MP convergence network such as a cable network or a WLAN network. In this way, all bandwidth information is allocated globally, it is ensured that no upstream congestion or no packet loss occurs in a network.

Figure 11:
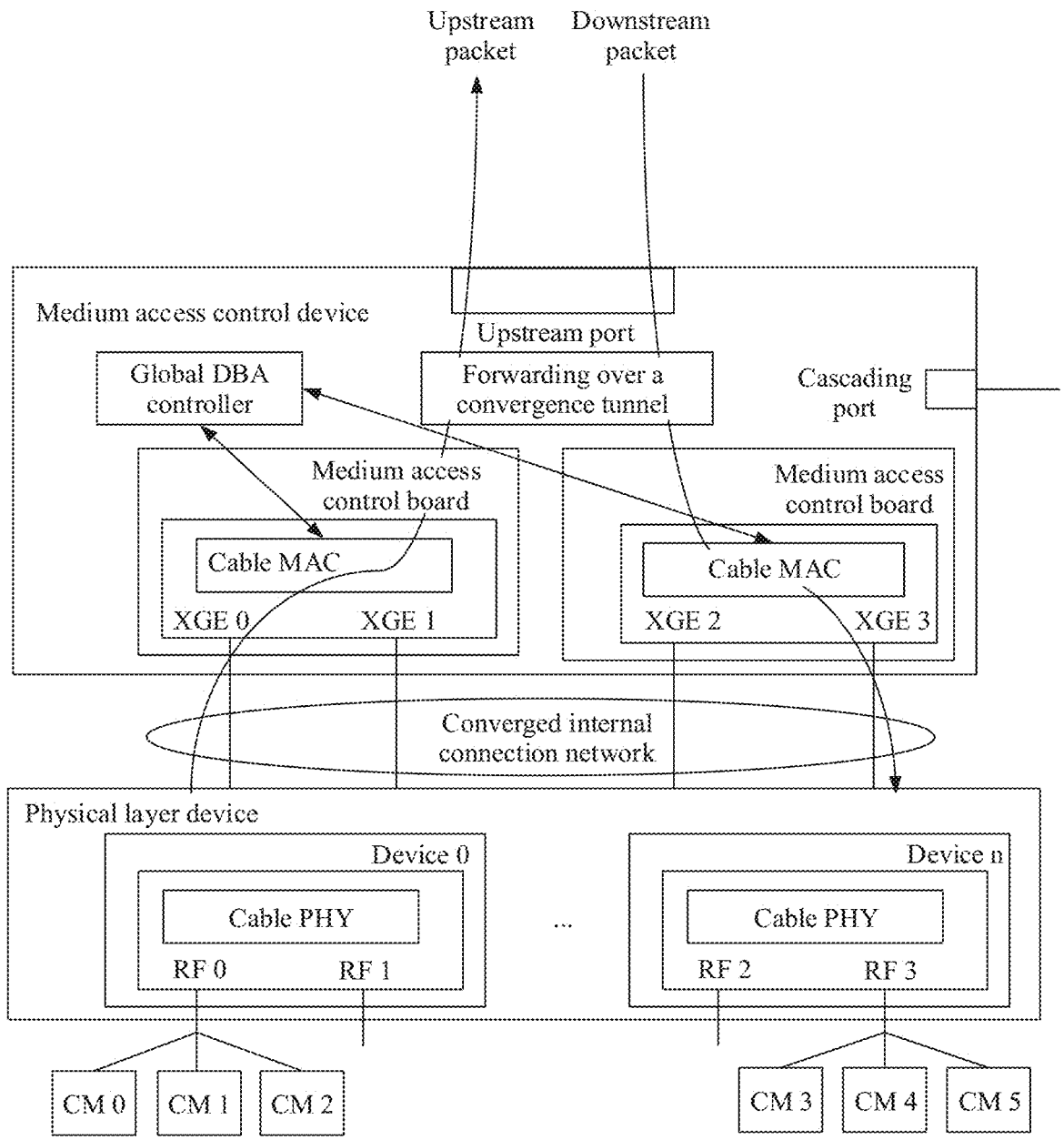
FIG. 11 is a schematic diagram of deployment of a global dynamic bandwidth allocation controller in a cable network according to an embodiment of this application.

In a specific embodiment, referring to FIG. 11, FIG. 11 is a schematic diagram of deployment of a global DBA controller in a cable network according to an embodiment of this application. As shown in FIG. 11, in the cable network, a plurality of CMs send bandwidth request messages through different radio frequency (RF) ports. The bandwidth request messages pass through a physical layer device and an intermediate access network (for example, a convergent internal connection network (CIN), then arrive at a medium access control device, and arrive at the global DBA controller through network interfaces (that is, 10-Gigabit Ethernet ports (XGE)). The global DBA controller receives the bandwidth request messages, performs global scheduling, allocates bandwidth information allocation, and sends the allocated bandwidth information to the plurality of CMs through the XGE ports and the RF ports. The plurality of CMs send upstream packets on the allocated bandwidth information. The medium access control device receives, through the XGE ports, the upstream packets sent by all the CMs, and sends all the received upstream packets to an upper-level convergence device (for example, a router, a BNG, or a BRAS) through an upstream port.

It may be understood that, in the cable network, the global DBA controller also controls upstream bandwidth information allocation and traffic scheduling of all the CMs. In particular, because different physical channels are provided with different parameters and different attributes, a bandwidth information allocation process is slightly different from that in the foregoing embodiment in which the global DBA controller is deployed in the PON network. However, an entire network architecture and an implementation method are consistent with those in the foregoing embodiment. Reference is made to the descriptions of the foregoing method embodiment in FIG. 4, and the descriptions of the embodiment of the bandwidth information allocation process corresponding to the structure of the global DBA controller and a structure of an internal unit that are shown in FIG. 5 to FIG. 10, and details are not described herein again.

Figure 12:
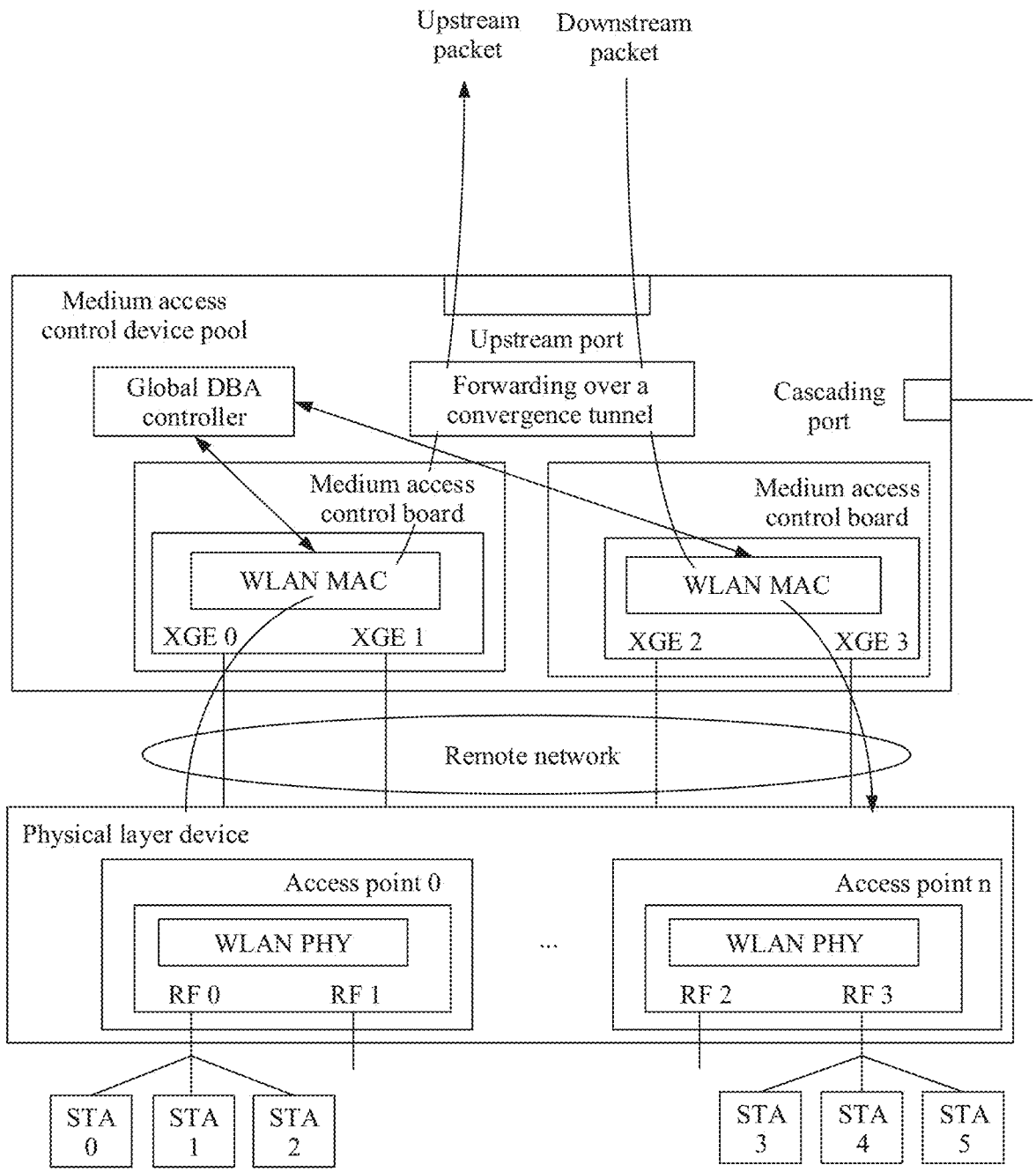
FIG. 12 is a schematic diagram of deployment of a global dynamic bandwidth allocation controller in a WLAN network according to an embodiment of this application.

In a specific embodiment, referring to FIG. 12, FIG. 12 is a schematic diagram of deployment of a global DBA controller in a WLAN network according to an embodiment of this application. As shown in FIG. 12, in the WLAN network, a plurality of stations (STA) send bandwidth request messages through different RF ports. The bandwidth request messages pass through a physical layer device (for example, an access point (AP)) and an intermediate access network (for example, a remote network), then arrive at a medium access control device, and arrive at the global DBA controller through network interfaces (XGE ports). The global DBA controller receives the bandwidth request messages, performs global scheduling, allocates bandwidth information, and sends the allocated bandwidth information to the plurality of STAs through the XGE ports and the RF ports. The plurality of STAs send upstream packets on the allocated bandwidth information. The medium access control device receives, through the XGE ports, upstream packets sent by all the STAs, and sends all the received upstream packets to an upper-level convergence device (for example, a router, a BNG, or a BRAS) through an upstream port.

It should be noted that, before the 802.1ac protocol is released, in the WLAN network, the MAC layer still uses an Ethernet-like carrier sense multiple access/collision detection (CSMA/CD) solution. Due to a conflict, bandwidth usage decreases markedly when a quantity of users increases (that is, a quantity of STAs increases). After the 802.1ax protocol is released, an upstream TDMA control policy is introduced, and a global DBA controller needs to be deployed for global scheduling and bandwidth information allocation.

Further, in a future-oriented evolution architecture of the WLAN network, because a solution of a remote AP architecture needs to be used, MAC layer resources need to be pooled (that is, a plurality of APs may be converged to one medium access control device). In this case, a global DBA controller also needs to be deployed, to perform bandwidth control and bandwidth information allocation for users served by the plurality of APs.

It may be understood that, in the WLAN network, the global DBA controller also controls upstream bandwidth information allocation and traffic scheduling of all the STAs. In particular, because different physical channels are provided with different parameters and different attributes, a specific bandwidth allocation process is slightly different from that in a PON network. However, an entire network architecture and an implementation method are consistent with those of the PON network. Reference is made to the descriptions of the foregoing method embodiment in FIG. 4, and the descriptions of the embodiment of the bandwidth allocation process corresponding to the structure of the global DBA controller and a structure of an internal unit that are shown in FIG. 5 to FIG. 10. Details are not described herein again.

It should be noted that all the foregoing embodiments are implemented by deploying the global DBA controller on a bottom-layer network convergence device (for example, an OLT or a medium access control device), that is, the global DBA controller is deployed on a level-2 convergence device.

However, the global DBA controller may be further deployed on a higher-level network convergence device (that is, a level-1 convergence device, such as a backbone edge router, a BNG, or a BRAS) or a control and management device, to allocate the bandwidth information globally.

In a specific embodiment of this application, the global DBA controller may be deployed on the level-1 convergence device (the backbone router, the BRAS, or the BNG) or the control and management device (a device that controls and manages the level-2 convergence device and/or the level-1 convergence device), to implement global bandwidth control and allocation of all bandwidth information.

It should be understood that, for a convergence network, a higher deployment location of the global DBA controller indicates a larger quantity of supported users, a higher specification of to-be-allocated bandwidth information, higher complexity and difficulty of a chip or a device that bears the global DBA controller, and a better bandwidth sharing effect for an entire network system. In this case, a structure and a bandwidth allocation method of the global DBA controller do not need to be changed. In addition, when the global DBA controller is deployed in an excessively high location, a propagation delay of a bandwidth request message and a propagation delay of a bandwidth allocation message increase. A delay optimization algorithm may be used for optimization and improvement, to ensure time synchronization of the entire system, and reduce an upstream forwarding delay. A specific delay optimization algorithm to be used is not limited in this application.

Figure 13A:
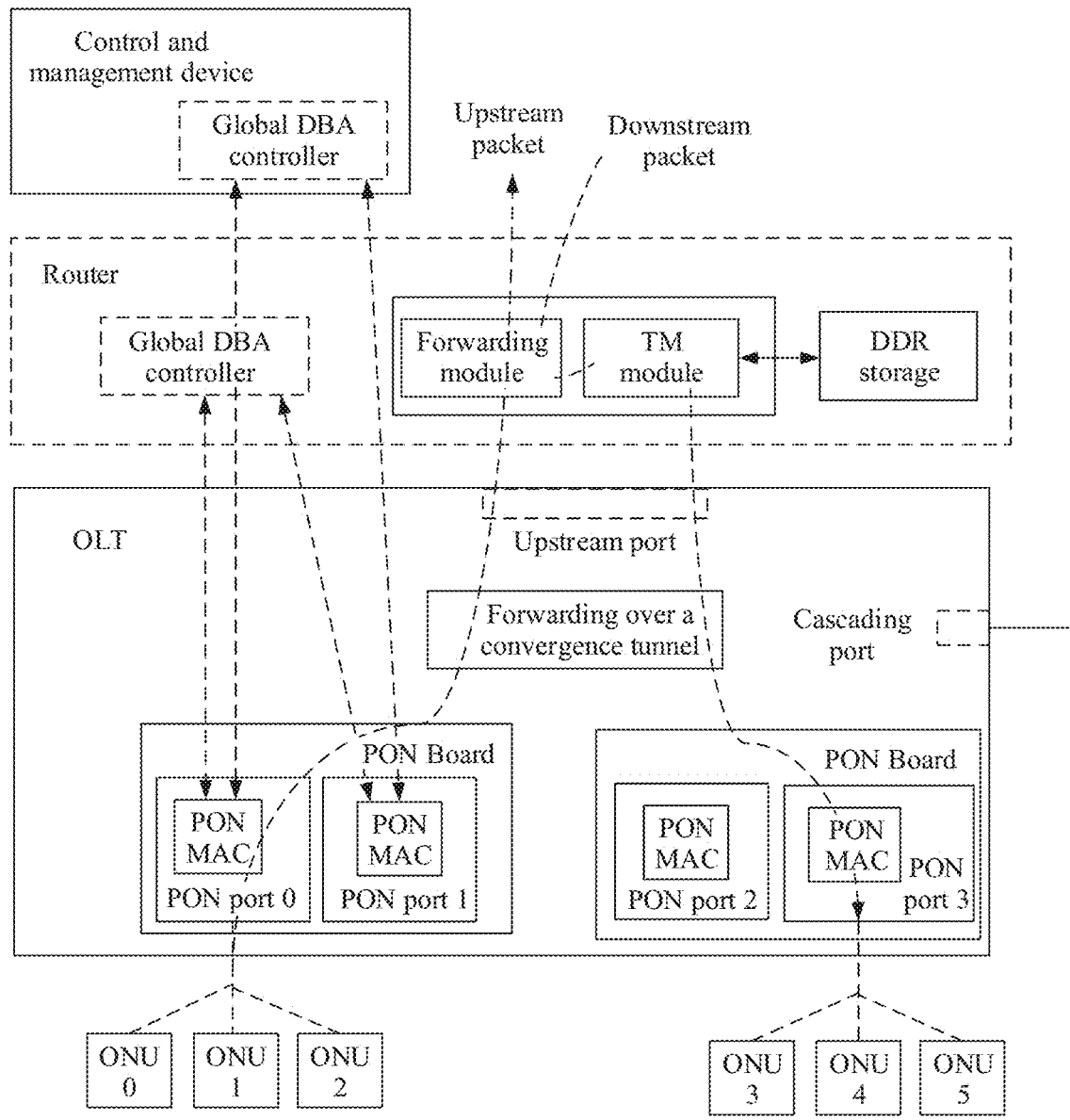
FIG. 13A is a schematic diagram of deployment of global dynamic bandwidth controllers in a PON network according to an embodiment of this application.
Figure 13B:
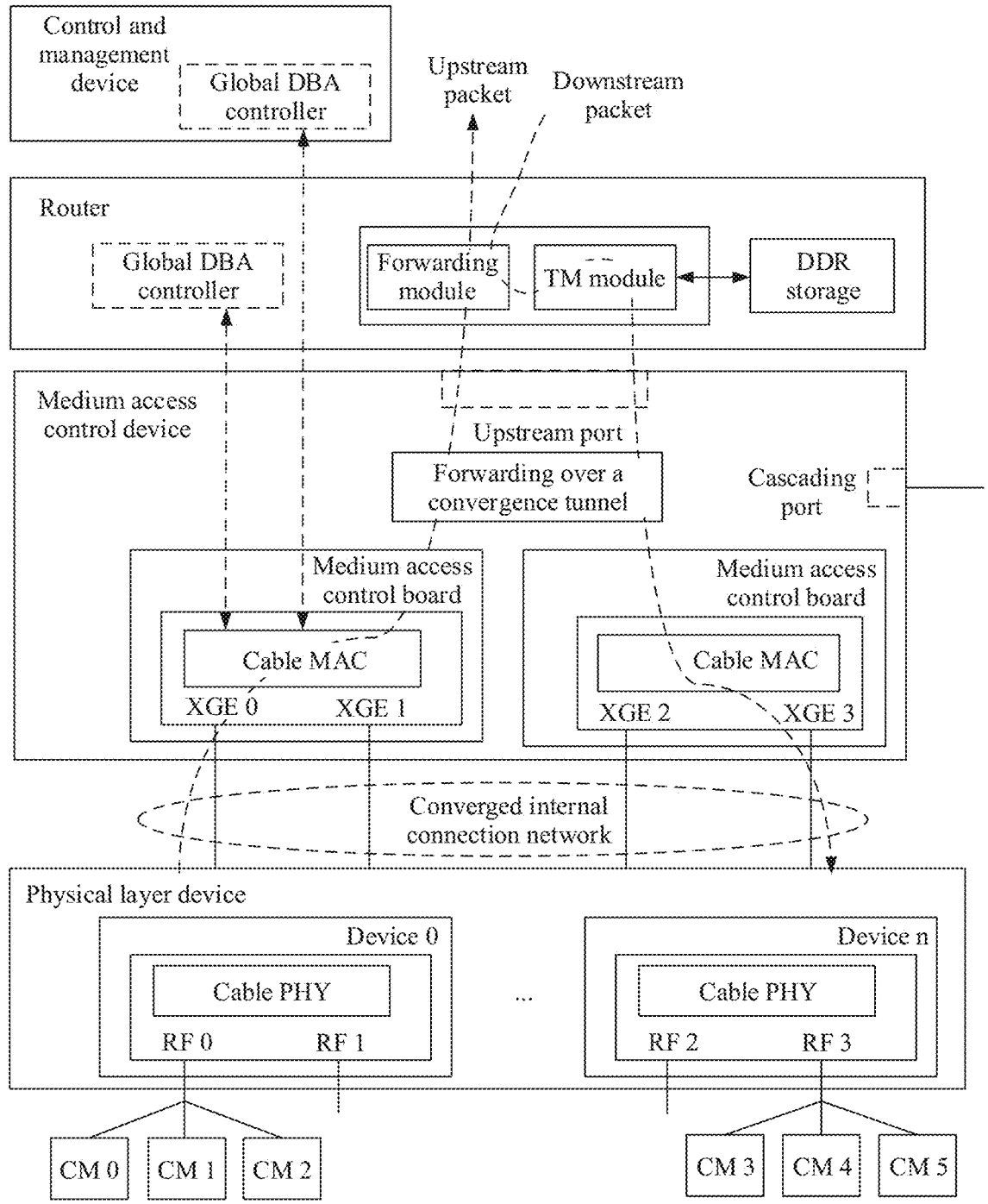
FIG. 13B is another schematic diagram of deployment of global dynamic bandwidth allocation controllers in a cable network according to an embodiment of this application.
Figure 13C:
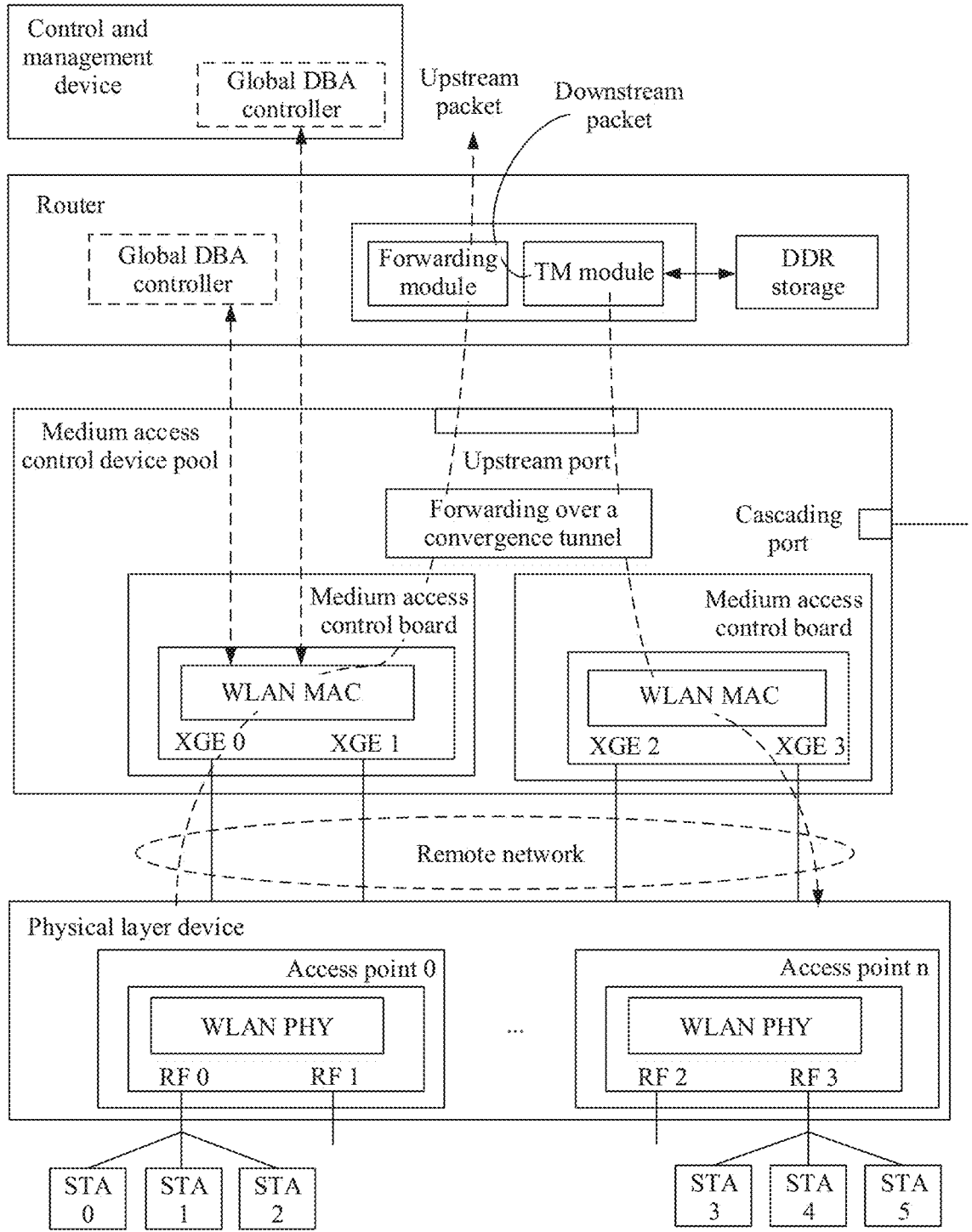
FIG. 13C is another schematic diagram of deployment of global dynamic bandwidth allocation controllers in a WLAN network according to an embodiment of this application.

In a specific embodiment, referring to FIG. 13A, FIG. 13A is a schematic diagram of deployment of a global DBA controller in a PON network according to an embodiment of this application. As shown in FIG. 13A, in the PON network, the global DBA controller may not need to be deployed on an OLT, but is deployed in a router or a PON network control and management device. The global DBA controller in the router or the PON network control and management device implements global bandwidth control and allocation of all bandwidth information. Refer to FIG. 13B and FIG. 13C. As shown in FIG. 13B, in a cable network, a global DBA controller may alternatively be deployed in a router or a cable network control and management device (for example, a cloud-based distributed converged cable access platform (CCAP)). The global DBA controller in the router or the control and management device implements global bandwidth control and allocation of all bandwidth information in the cable network. As shown in FIG. 13C, in a WLAN network, a global DBA controller may alternatively be deployed in a router or a WLAN network control and management device. The global DBA controller in the router or the WLAN network control and management device implements global bandwidth control and allocation of all bandwidth information in the WLAN network.

It may be understood that the global DBA controller may be flexibly deployed, an architecture and a bandwidth allocation implementation method of the global DBA controller do not need to be changed, and a higher level of a network convergence device deployed for the global DBA controller indicates a better bandwidth sharing effect of the entire network system.

It should be noted that the global DBA controller is not only deployed flexibly, but also may be deployed in a multi-level manner, that is, deployed on network convergence devices at different levels (for example, a router and a control and management device) at the same time. For a structure and a bandwidth control allocation method of a global DBA controller at each level, refer to the descriptions in the embodiments in FIG. 4 to FIG. 10. The global DBA controller at each level may adjust specific implementation units and specific implementation steps, but that functions of the entire global DBA controller remain consistent with bandwidth control allocation logic remains unchanged.

Figure 14:
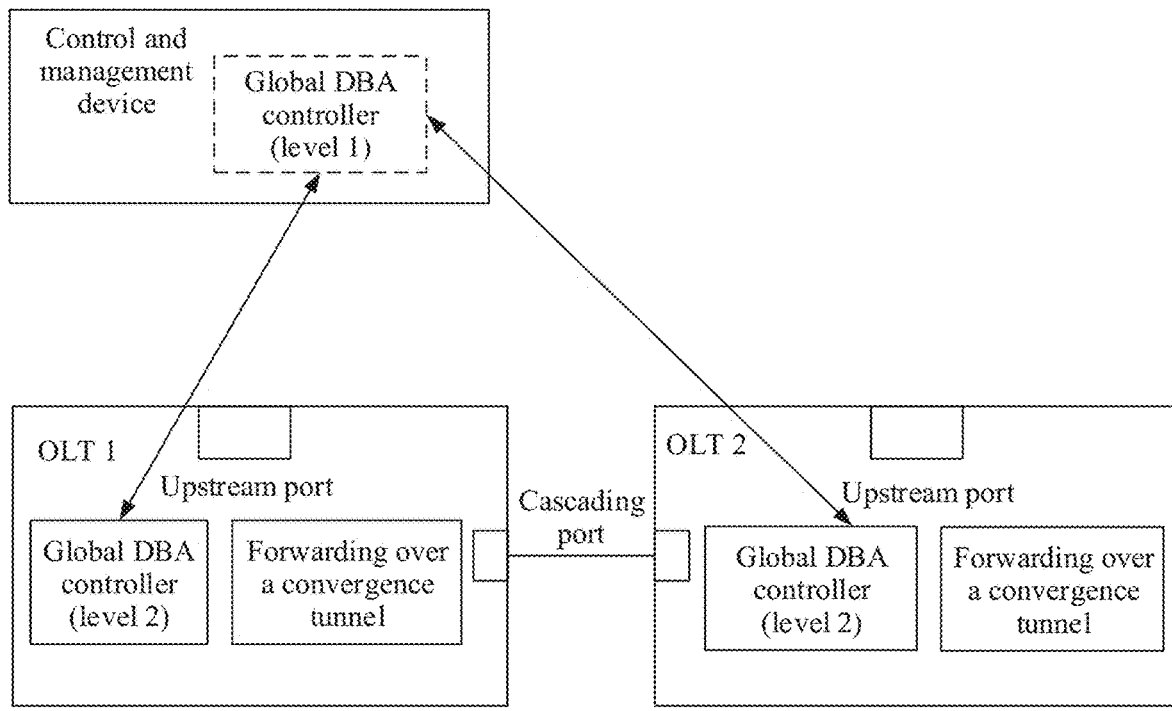
FIG. 14 is a schematic diagram of multi-level deployment of global dynamic bandwidth controllers in a PON network according to an embodiment of this application.

In a specific embodiment, referring to FIG. 14, FIG. 14 is a schematic diagram of multi-level deployment of global DBA controllers in a PON network according to an embodiment of this application. As shown in FIG. 14, in the PON network, the global DBA controllers are deployed at two levels. Level-2 global DBA controllers are deployed on level-2 convergence devices (for example, OLTs), and a level-1 global DBA controller is deployed on a level-1 convergence device (for example, a BRAS, a BNG, or a backbone network edge router) or a control and management device. It should be understood that, when the two levels of global DBA controllers are used to control a system bandwidth, a total upstream bandwidth of a level-2 global DBA controller in an OLT is no longer fixedly configured, but is dynamically allocated by the level-1 global DBA controller on the level-1 convergence device or the control and management device; and a user of the level-1 global DBA controller is no longer an ONU, but the level-2 global DBA controller in the OLT, and the level-1 global DBA controller receives a bandwidth request message that is sent by the level-2 global DBA controller in the OLT and on which real-time calculation and summarization are performed. The level-1 global DBA controller in the control and management device performs real-time dynamic bandwidth scheduling and allocation calculation, and sends allocation result information to the level-2 global DBA controller in the OLT, thereby implementing global control and allocation of all bandwidths. It should be noted that, in this case, the bandwidth allocation information is no longer timestamp information based on PON ports, but a total quantity of tokens. That is, bandwidth information of upstream egress ports of the OLTs is dynamically allocated and limited. In addition, because bandwidth request messages of all the OLTs need to be converged to the control and management device, a total upstream bandwidth of all the OLTs may be limited based on actual requirements. It should be understood that the global DBA controllers may alternatively be deployed on both an OLT and a router, and deployed on a router and a control and management device. An implementation process of the deployment is consistent with the foregoing process, and details are not described herein again.

Further, the global DBA controllers may be deployed at three levels. For example, a level-1 global DBA controller is deployed on a control and management device, a level-2 global DBA controller is deployed on a level-1 convergence device, and a level-3 global DBA controller is deployed on a level-2 convergence device. The level-1 global DBA controller performs global allocation and scheduling on a bandwidth of an upstream egress port of the level-1 convergence device. The level-2 global DBA controller performs global allocation and scheduling on a bandwidth of an upstream egress port of the level-2 convergence device (for example, a backbone network edge router, a BRAS, and a BNG). The level-3 global DBA controller performs global allocation and scheduling on a bandwidth of an upstream egress port of an access device (for example, an ONU). A specific processing manner is similar to the methods in FIG. 1 to FIG. 14. For brevity, details are not described again. In addition, in a convergence network such as a cable network or a WLAN network, global DBA controllers may alternatively be deployed at a plurality of levels, and the whole implementation logic is similar to the foregoing logic, that is, a total upstream bandwidth corresponding to a global DBA controller in a device with a lower convergence level is dynamically allocated by a global DBA controller in a device with a higher convergence level, and details are not described herein again. A specific deployment level is not limited in this application.

It may be understood that deploying the global DBA controllers at the plurality of levels can reduce implementation difficulty and complexity of the global DBA controllers, reduce manufacturing costs of the global DBA controllers, and improve bandwidth control and allocation efficiency of an entire network system.

To better implement the foregoing solutions of the embodiments of this application, related apparatuses that are used for implementing the foregoing solutions in a cooperative manner are further provided below.

Figure 15:
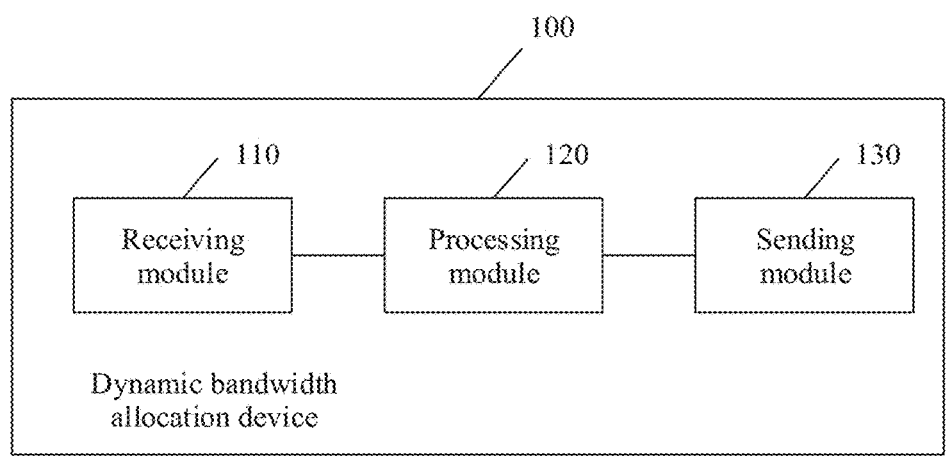
FIG. 15 is a schematic structural diagram of a dynamic bandwidth allocation device according to an embodiment of this application.

FIG. 15 is a schematic structural diagram of a dynamic bandwidth allocation device according to an embodiment of this application. The dynamic bandwidth allocation device 100 includes at least a receiving module 110, a processing module 120, and a sending module 130.

The receiving module 110 is configured to receive bandwidth request messages from bandwidth request devices through at least two access ports of a convergence device. The bandwidth request messages include a first bandwidth request message from a first bandwidth request device received through a first access port of the convergence device, and the first bandwidth request message includes bandwidth information requested by the first bandwidth request device.

The processing module 120 is configured to allocate bandwidth information to the first bandwidth request device based on the bandwidth information requested by the first bandwidth request device and remaining bandwidth information of an upstream egress port of the convergence device. The remaining bandwidth information is a difference between limited bandwidth information of the upstream egress port and bandwidth information already allocated before the first bandwidth request message is received.

The sending module 130 is configured to send a response message to the first bandwidth request device through the first access port. The response message includes the bandwidth information allocated to the first bandwidth request device.

In this embodiment of this application, the receiving module 110 receives, through a plurality of access ports of the convergence device, the bandwidth request messages sent by all the bandwidth request devices; the processing module 120 allocates bandwidth information to the bandwidth request devices based on the remaining bandwidth information of the upstream egress port of the convergence device; and the sending module 130 sends the bandwidth information to the bandwidth request devices. In this way, a sum of bandwidth information requested by using all the upstream bandwidth request messages can be accurately collected. In addition, scheduling and global allocation are performed for all the bandwidth request messages, to ensure that bandwidth information occupied by total upstream traffic does not exceed the limited bandwidth information of the upstream egress port of the convergence device. Therefore, upstream congestion and an internal packet loss are avoided, and costs and power consumption of the convergence device are effectively reduced.

In an embodiment, the processing module 120 is further configured to: allocate bandwidth information of a logical access port to the first bandwidth request device, to obtain a startup time of a time slice obtained by the first bandwidth request device through allocation on the logical access port, where the bandwidth information of the logical access port is equal to the remaining bandwidth information of the upstream egress port; and allocate bandwidth information of the first access port to the first bandwidth request device based on the startup time, to obtain a start time of a time slice obtained by the first bandwidth request device through allocation on the first access port, where a difference between the start time and the startup time is less than a first threshold.

In an embodiment, the processing module 120 is further configured to: determine the bandwidth information requested by using the first bandwidth request message; and if the bandwidth information requested by using the first bandwidth request message is greater than a second threshold, generate a plurality of bandwidth request sub-messages based on the bandwidth information requested by using the first bandwidth request message, where a sum of bandwidth information requested by using the plurality of bandwidth request sub-messages is equal to the bandwidth information requested by using the first bandwidth request message; or if the bandwidth information requested by using the first bandwidth request message is less than a third threshold, block the first bandwidth request message, continue to receive a second bandwidth request message sent by the first bandwidth request device, and reassemble the first bandwidth request message and the second bandwidth request message to obtain a reassembled bandwidth request message, where bandwidth information requested by using the reassembled bandwidth request message is equal to a sum of the bandwidth information requested by using the first bandwidth request message and bandwidth information requested by using the second bandwidth request message; and when the bandwidth information requested by using the reassembled bandwidth request message is greater than a fourth threshold, allocate bandwidth information to the first bandwidth request device based on the bandwidth information requested by using the reassembled bandwidth request message and the remaining bandwidth information of the upstream egress port of the convergence device; or when a waiting time is greater than a fifth threshold, unblock the first bandwidth request message.

In an embodiment, the processing module 120 is further configured to: bandwidth information allocated to the first bandwidth request device through a first-level port is less than or equal to configured bandwidth information of an upstream egress of the first-level port; and bandwidth information allocated to the first bandwidth request device through a second-level port is less than or equal to configured bandwidth information of an upstream egress of the second-level port. The first-level port is higher than the second-level port, and the bandwidth information allocated to the first bandwidth request device through the first-level port is less than or equal to the remaining bandwidth information of the upstream egress port of the convergence device.

In an embodiment, the sending module 130 is further configured to send the response message to the convergence device through cascading ports.

In an embodiment, the bandwidth information includes byte length information and/or time slice information that are/is allowed to be sent, and the time slice information includes start time information and time length information.

In an embodiment, the processing module 120 is further configured to keep time synchronization with the bandwidth request device according to a time synchronization protocol.

In an embodiment, when the convergence device is a level-2 convergence device, the first bandwidth request device is a first access device, and the first bandwidth request message is a bandwidth request message sent by the first access device. The receiving module 110 is further configured to receive bandwidth request messages from access devices through at least two access ports of the level-2 convergence device. The bandwidth request messages include a first bandwidth request message from the first access device received through a first access port of the level-2 convergence device, and the first bandwidth request message includes bandwidth information requested by the first access device. The processing module 120 is further configured to allocate bandwidth information to the first access device based on the bandwidth information requested by the first access device and remaining bandwidth information of an upstream egress port of the level-2 convergence device. The remaining bandwidth information is a difference between limited bandwidth information of the upstream egress port of the level-2 convergence device and the bandwidth information already allocated before the first bandwidth request message is received. The sending module 130 is further configured to send a response message to the first access device through the first access port of the level-2 convergence device. The response message includes the bandwidth information allocated to the first access device.

In an embodiment, when the convergence device is a level-1 convergence device, the first bandwidth request device is a first level-2 convergence device, the first bandwidth request message is a bandwidth request message sent by the first level-2 convergence device, and the bandwidth information requested by using the first bandwidth request message is a sum of bandwidth information requested by using a bandwidth request message sent by at least one access device. The receiving module no is further configured to receive bandwidth request messages from first level-2 convergence devices through at least two access ports of the level-1 convergence device. The bandwidth request messages include the first bandwidth request message from the first level-2 convergence device received through a first access port of the level-1 convergence device, and the first bandwidth request message includes bandwidth information requested by the first level-2 convergence device. The processing module 120 is further configured to allocate bandwidth information to the first level-2 convergence device based on the bandwidth information requested by the first level-2 convergence device and remaining bandwidth information of an upstream egress port of the level-1 convergence device. The remaining bandwidth information is a difference between limited bandwidth information of the upstream egress port of the level-1 convergence device and the bandwidth information already allocated before the first bandwidth request message is received. The sending module 130 is further configured to send a response message to the first level-2 convergence device through the first access port of the level-1 convergence device. The response message includes the bandwidth information allocated to an upstream egress port of the first level-2 convergence device.

It may be understood that the receiving module no and the sending module 130 in this embodiment of this application may be implemented by a transceiver or a transceiver-related circuit component, and the processing module 120 may be implemented by a processor or a processor-related circuit component.

Figure 16:
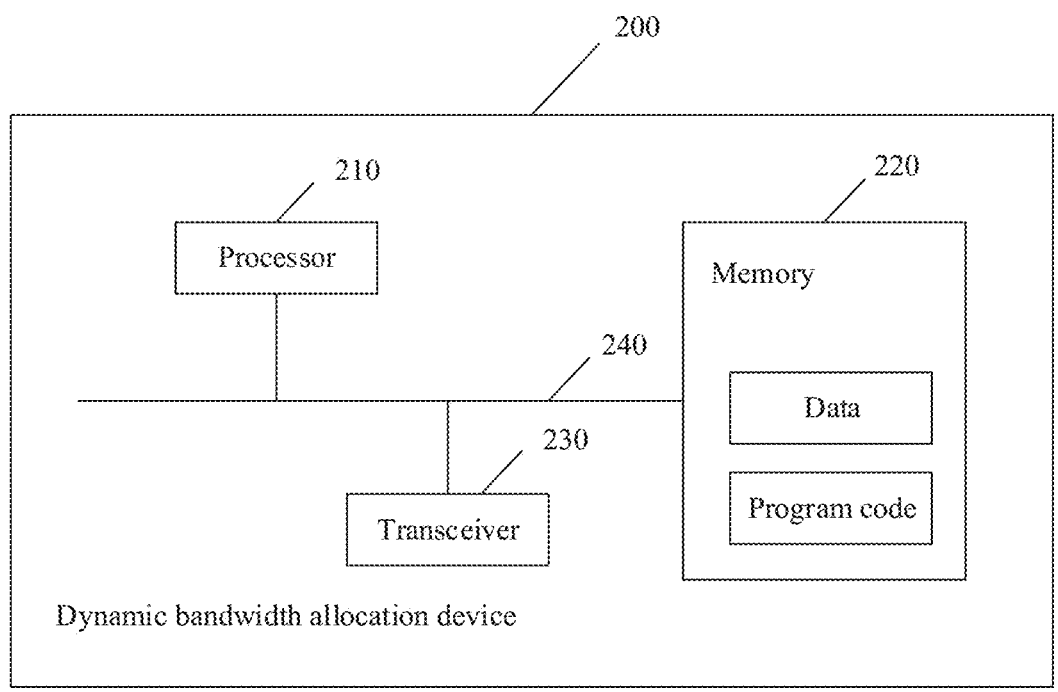
FIG. 16 is a schematic structural diagram of another dynamic bandwidth allocation device according to an embodiment of this application.

FIG. 16 is a schematic structural diagram of another dynamic bandwidth allocation device according to an embodiment of this application. The dynamic bandwidth allocation device 200 includes a processor 210, a memory 220, and a transceiver 230. The processor 210, the memory 220, and the transceiver 230 are connected to each other by using a bus 240. The memory 220 stores an instruction or a program, and the processor 210 is configured to execute the instruction or program stored in the memory 220. When the instruction or the program stored in the memory 220 is executed, the processor 210 is configured to perform the operations performed by the processing module 120 in the foregoing embodiment, and the transceiver 230 is configured to perform the operations performed by the receiving module 110 or the sending module 130 in the foregoing embodiment.

It should be noted that the dynamic bandwidth allocation device 100 or the dynamic bandwidth allocation device 200 in the foregoing embodiment of this application may correspond to the dynamic bandwidth allocation device in the method embodiment provided in this application. In addition, the operations and/or functions of the modules of the dynamic bandwidth allocation device 100 or the dynamic bandwidth allocation device 200 are performed to implement corresponding procedures of the methods in FIG. 1 to FIG. 14. For brevity, details are not described herein again.

An embodiment of this application further provides a computer readable storage medium. The computer readable storage medium stores a computer program. When the program is executed by a processor, a procedure related to the dynamic bandwidth allocation device in the dynamic bandwidth allocation method provided in the foregoing method embodiment can be implemented.

An embodiment of this application further provides a computer program product. When the computer program product is run on a computer or a processor, the computer or the processor is enabled to perform one or more steps in any one of the foregoing dynamic bandwidth allocation methods. When the foregoing composition modules of the device are implemented in a form of a software functional unit and sold or used as an independent product, the composition modules may be stored in the computer readable storage medium.

It should be understood that, the processor mentioned in the embodiments of this application may be a central processing unit (CPU), or may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

It may also be understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, a discrete gate or a transistor logic device, or discrete hardware component, the memory (storage module) is integrated into the processor.

It should be noted that the memory described in this specification is intended to include but is not limited to these and any memory of another proper type.

It should be further understood that "first", "second", "third", "fourth", and various numerical symbols in this specification are merely used for differentiation for ease of description, and are not construed as a limitation to the scope of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes shall be determined based on functions and internal logic of the processes, and shall not be construed as any limitation to the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

A sequence of the steps of the method in the embodiments of this application may be adjusted, combined, or removed based on an actual requirement.

The modules in the apparatus in the embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art shall understand that they may still make modifications to the technical solutions described in the foregoing embodiments or make equivalent replacements to some technical features thereof, without departing from the scope of the technical solutions of the embodiments of this application.

What is claimed is:

1. A method comprising:
   receiving bandwidth request messages from bandwidth request devices through at least two access ports of a convergence device in a communications network, wherein the bandwidth request messages comprise a first bandwidth request message received from a first bandwidth request device through a first access port of the convergence device, and the first bandwidth request message comprises bandwidth information requested by the first bandwidth request device for upstream transmission via the convergence device;
   allocating a first bandwidth to the first bandwidth request device based on the bandwidth information requested by the first bandwidth request device and a remaining bandwidth of an upstream egress port of the convergence device, wherein the remaining bandwidth is a difference between a limited bandwidth of the upstream egress port of the convergence device and a second bandwidth already allocated for upstream transmission before the first bandwidth request message is received; and
   sending a response message to the first bandwidth request device through the first access port, wherein the response message comprises information of the first bandwidth allocated to the first bandwidth request device.

2. The method according to claim 1, wherein allocating the first bandwidth to the first bandwidth request device comprises:
allocating a third bandwidth of a logical access port to the first bandwidth request device, and obtaining a first start time of a time slice allocated to the first bandwidth request device on the logical access port, wherein the third bandwidth of the logical access port is equal to the remaining bandwidth of the upstream egress port; and
allocating a fourth bandwidth of the first access port to the first bandwidth request device based on the first start time, and obtaining a second start time of a time slice allocated to the first bandwidth request device on the first access port, wherein a difference between the first start time and the second start time is less than a first threshold.

3. The method according to claim 1, wherein after receiving the bandwidth request messages from the bandwidth request devices through the at least two access ports of the convergence device, the method further comprises:
determining the bandwidth information requested using the first bandwidth request message; and
when the bandwidth information requested using the first bandwidth request message is greater than a second threshold, generating a plurality of bandwidth request sub-messages based on the bandwidth information requested using the first bandwidth request message, wherein a sum of bandwidth information requested using the plurality of bandwidth request sub-messages is equal to the bandwidth information requested using the first bandwidth request message; or
when the bandwidth information requested using the first bandwidth request message is less than a third threshold, blocking the first bandwidth request message, subsequently receiving a second bandwidth request message sent by the first bandwidth request device, and reassembling the first bandwidth request message and the second bandwidth request message to obtain a reassembled bandwidth request message, wherein bandwidth information requested using the reassembled bandwidth request message is equal to a sum of the bandwidth information requested using the first bandwidth request message and bandwidth information requested using the second bandwidth request message; and
when the bandwidth information requested using the reassembled bandwidth request message is greater than a fourth threshold, allocating bandwidth information to the first bandwidth request device based on the bandwidth information requested using the reassembled bandwidth request message and the remaining bandwidth of the upstream egress port of the convergence device; or
when a waiting time is greater than a fifth threshold, unblocking the first bandwidth request message.

4. The method according to claim 1, wherein allocating the first bandwidth to the first bandwidth request device based on the bandwidth information requested by the first bandwidth request device and the remaining bandwidth of the upstream egress port of the convergence device comprises:
allocating, to the first bandwidth request device through a first-level port, a fifth bandwidth that is less than or equal to a configured bandwidth of an upstream egress of the first-level port; and
allocating, to the first bandwidth request device through a second-level port, a sixth bandwidth that is less than or equal to a configured bandwidth of an upstream egress of the second-level port, wherein
the fifth bandwidth allocated to the first bandwidth request device through the first-level port is less than or equal to the remaining bandwidth of the upstream egress port of the convergence device.

5. The method according to claim 1, wherein before sending the response message to the first bandwidth request device through the first access port, the method further comprises:
sending the response message to the convergence device through cascading ports.

6. The method according to claim 1, wherein the first bandwidth comprises byte length information of data that is allowed to transmit, or time slice information, and the time slice information comprises start time information and time length information of a time slice.

7. The method according to claim 1, wherein the method further comprises:
keeping time synchronization with the bandwidth request devices according to a time synchronization protocol.

8. The method according to claim 1, wherein when the convergence device is a level-2 convergence device, the first bandwidth request device is a first access device, and the first bandwidth request message is sent by the first access device.

9. The method according to claim 1, wherein when the convergence device is a level-1 convergence device, the first bandwidth request device is a first level-2 convergence device, the first bandwidth request message is a bandwidth request message sent by the first level-2 convergence device, and the bandwidth information requested using the first bandwidth request message is a sum of bandwidth information requested using a bandwidth request message sent by at least one access device.

10. A device comprising one or more processors, a memory, and a transceiver, wherein
the one or more processors, the memory, and the transceiver are connected to each other, the memory is configured to store a computer program, the computer program comprises a program instruction, which when executed by the processor, causes the one or more processors to perform operations comprising:
receiving bandwidth request messages from bandwidth request devices through at least two access ports of a convergence device in a communications network, wherein the bandwidth request messages comprise a first bandwidth request message received from a first bandwidth request device through a first access port of the convergence device, and the first bandwidth request message comprises bandwidth information requested by the first bandwidth request device for upstream transmission via the convergence device;
allocating a first bandwidth to the first bandwidth request device based on the bandwidth information requested by the first bandwidth request device and a remaining bandwidth of an upstream egress port of the convergence device, wherein the remaining bandwidth is a difference between a limited bandwidth of the upstream egress port and a second bandwidth already allocated for upstream transmission before the first bandwidth request message is received; and
sending a response message to the first bandwidth request device through the first access port, wherein the response message comprises information of the first bandwidth allocated to the first bandwidth request device.

11. The device according to claim 10, wherein allocating the first bandwidth to the first bandwidth request device comprises:
- allocating a third bandwidth of a logical access port to the first bandwidth request device, and obtaining a first start time of a time slice allocated to the first bandwidth request device on the logical access port, wherein the third bandwidth of the logical access port is equal to the remaining bandwidth of the upstream egress port; and
- allocating a fourth bandwidth of the first access port to the first bandwidth request device based on the first start time, and obtaining a second start time of a time slice allocated to the first bandwidth request device on the first access port, wherein a difference between the first start time and the second start time is less than a first threshold.

12. The device according to claim 10, wherein after receiving the bandwidth request messages from the bandwidth request devices through the at least two access ports of the convergence device, the operations further comprise:
- determining the bandwidth information requested using the first bandwidth request message; and
- when the bandwidth information requested using the first bandwidth request message is greater than a second threshold, generating a plurality of bandwidth request sub-messages based on the bandwidth information requested using the first bandwidth request message, wherein a sum of bandwidth information requested using the plurality of bandwidth request sub-messages is equal to the bandwidth information requested using the first bandwidth request message; or
- when the bandwidth information requested using the first bandwidth request message is less than a third threshold, blocking the first bandwidth request message, subsequently receiving a second bandwidth request message sent by the first bandwidth request device, and reassembling the first bandwidth request message and the second bandwidth request message to obtain a reassembled bandwidth request message, wherein bandwidth information requested using the reassembled bandwidth request message is equal to a sum of the bandwidth information requested using the first bandwidth request message and bandwidth information requested using the second bandwidth request message; and
- when the bandwidth information requested using the reassembled bandwidth request message is greater than a fourth threshold, allocating bandwidth information to the first bandwidth request device based on the bandwidth information requested using the reassembled bandwidth request message and the remaining bandwidth of the upstream egress port of the convergence device; or when a waiting time is greater than a fifth threshold, unblocking the first bandwidth request message.

13. The device according to claim 10, wherein allocating the first bandwidth to the first bandwidth request device based on the bandwidth information requested by the first bandwidth request device and the remaining bandwidth of the upstream egress port of the convergence device comprises:
- allocating, to the first bandwidth request device through a first-level port, a fifth bandwidth that is less than or equal to a configured bandwidth of an upstream egress of the first-level port; and
- allocating, to the first bandwidth request device through a second-level port, a sixth bandwidth that is less than or equal to a configured bandwidth of an upstream egress of the second-level port, wherein
- the fifth bandwidth allocated to the first bandwidth request device through the first-level port is less than or equal to the remaining bandwidth of the upstream egress port of the convergence device.

14. The device according to claim 10, wherein before sending the response message to the first bandwidth request device through the first access port, the operations further comprise:
- sending the response message to the convergence device through cascading ports.

15. The device according to claim 10, wherein the first bandwidth comprises byte length information of data that is allowed to transmit, or time slice information, and the time slice information comprises start time information and time length information of a time slice.

16. The device according to claim 10, wherein the operations further comprise:
- keeping time synchronization with the bandwidth request devices according to a time synchronization protocol.

17. The device according to claim 10, wherein when the convergence device is a level-2 convergence device, the first bandwidth request device is a first access device, and the first bandwidth request message is sent by the first access device.

18. The device according to claim 10, wherein when the convergence device is a level-1 convergence device, the first bandwidth request device is a first level-2 convergence device, the first bandwidth request message is sent by the first level-2 convergence device, and the bandwidth information requested using the first bandwidth request message is a sum of bandwidth information requested using a bandwidth request message sent by at least one access device.

19. A computer non-transient storage medium, comprising an instruction, wherein when the instruction is run on a device, the device is enabled to perform:
- receiving bandwidth request messages from bandwidth request devices through at least two access ports of a convergence device in a communications network, wherein the bandwidth request messages comprise a first bandwidth request message received from a first bandwidth request device through a first access port of the convergence device, and the first bandwidth request message comprises bandwidth information requested by the first bandwidth request device for upstream transmission via the convergence device;
- allocating a first bandwidth to the first bandwidth request device based on the bandwidth information requested by the first bandwidth request device and a remaining bandwidth of an upstream egress port of the convergence device, wherein the remaining bandwidth is a difference between a limited bandwidth of the upstream egress port of the convergence device and a second bandwidth already allocated for upstream transmission before the first bandwidth request message is received; and
- sending a response message to the first bandwidth request device through the first access port, wherein the response message comprises information of the first bandwidth allocated to the first bandwidth request device.

* * * * *